United States Patent [19]

Sato

[11] Patent Number: 5,546,231

[45] Date of Patent: Aug. 13, 1996

[54] ZOOM LENS EMPLOYING PLASTIC LENSES

[75] Inventor: Hiroshi Sato, Hachioji, Japan

[73] Assignee: Konica Corporation, Tokyo, Japan

[21] Appl. No.: 366,908

[22] Filed: Dec. 30, 1994

[30] Foreign Application Priority Data

Jan. 18, 1994 [JP] Japan .................................. 6-003689

[51] Int. Cl.$^6$ ................................................. G02B 15/14
[52] U.S. Cl. ................................... 359/687; 359/683
[58] Field of Search ..................................... 359/683, 687

[56] References Cited

U.S. PATENT DOCUMENTS

| | | | |
|---|---|---|---|
| 5,100,223 | 5/1992 | Ono | 359/683 |
| 5,134,524 | 7/1992 | Hamano | 359/683 |
| 5,191,476 | 3/1993 | Sato | 359/687 |
| 5,218,476 | 6/1993 | Ito | 359/676 |
| 5,285,316 | 2/1994 | Miyano | 359/687 |
| 5,396,367 | 3/1995 | Ono | 359/687 |
| 5,424,869 | 6/1995 | Nanjo | 359/687 |

*Primary Examiner*—Georgia Y. Epps
*Assistant Examiner*—Ricky Mack
*Attorney, Agent, or Firm*—Finnegan, Henderson, Farabow, Garrett & Dunner, L.L.P.

[57] ABSTRACT

A zoom lens includes, in the order named from an object side, a first lens group having a positive refractive power, a second lens group having a negative refractive power, which is movable along an optical axis of the zoom lens in accordance with a magnification change, a fixed third lens group having a positive refractive power, and a fourth lens group having a positive refractive power, which is movable along the optical axis, to compensate for a positional change of an image plane according to the magnification change. The fourth lens group includes at least two positive lenses and at least one negative lens. At least two lenses constituting the fourth lens group are made from plastic lenses which are cemented together.

6 Claims, 20 Drawing Sheets

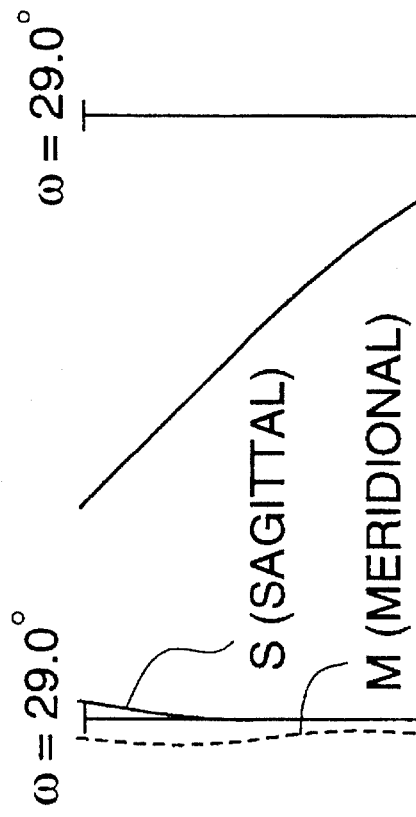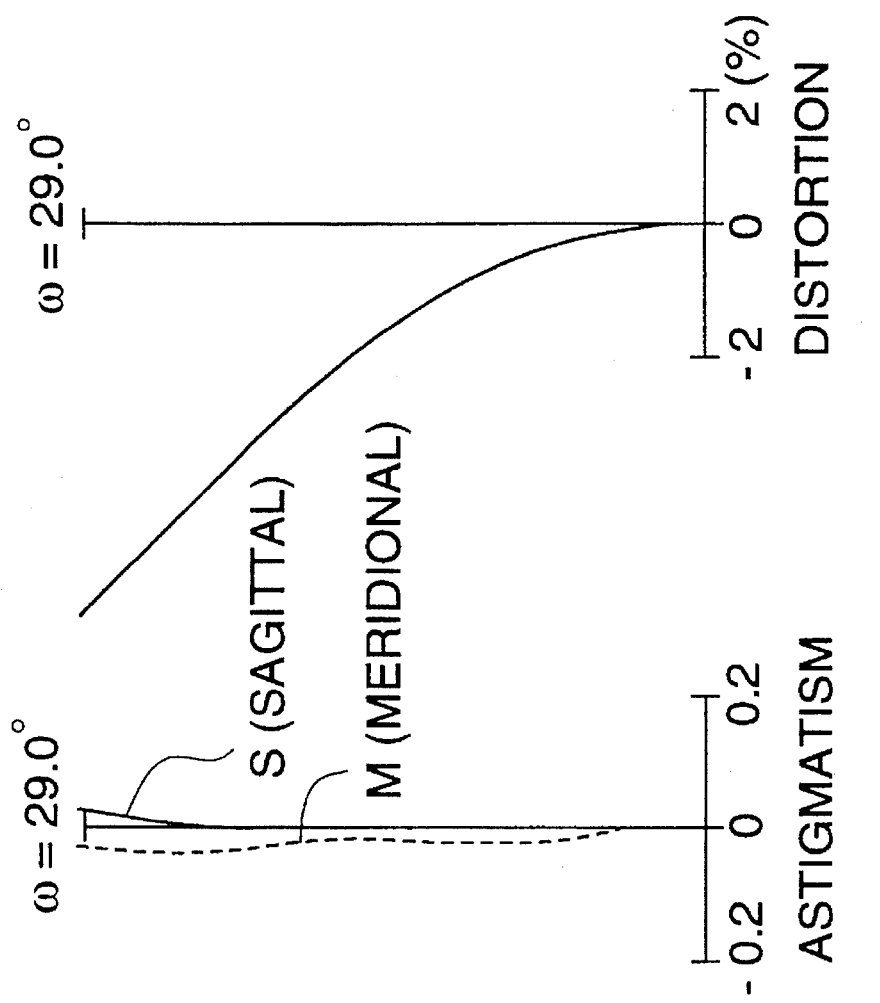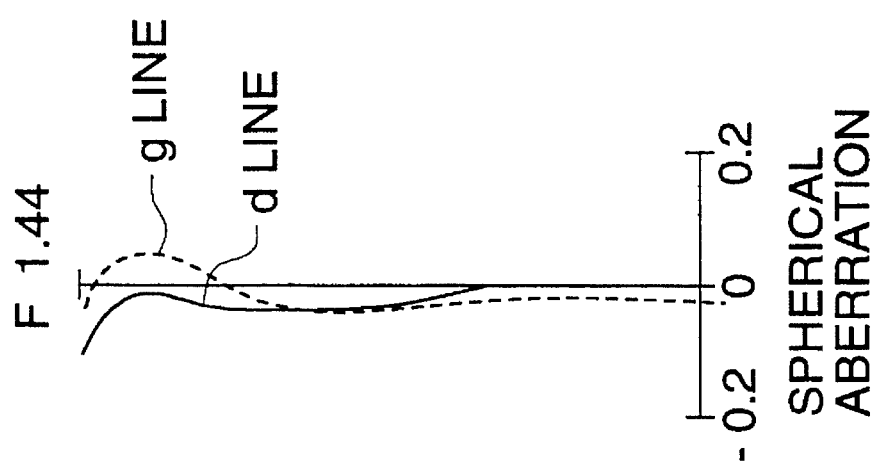

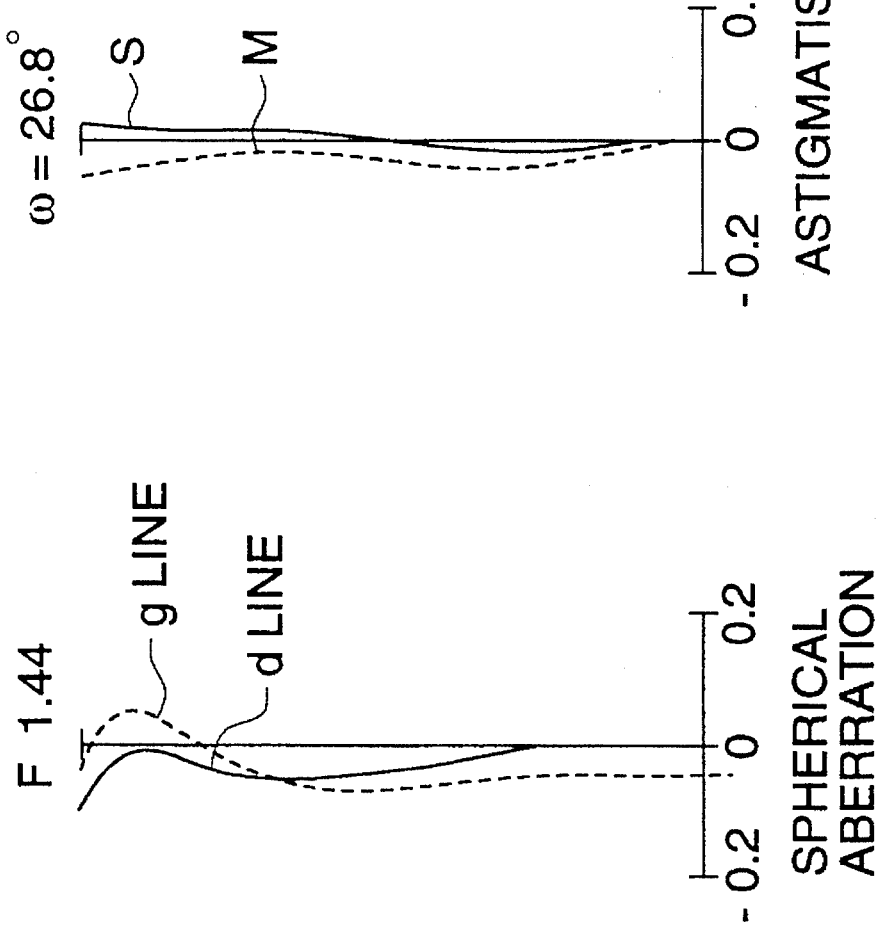
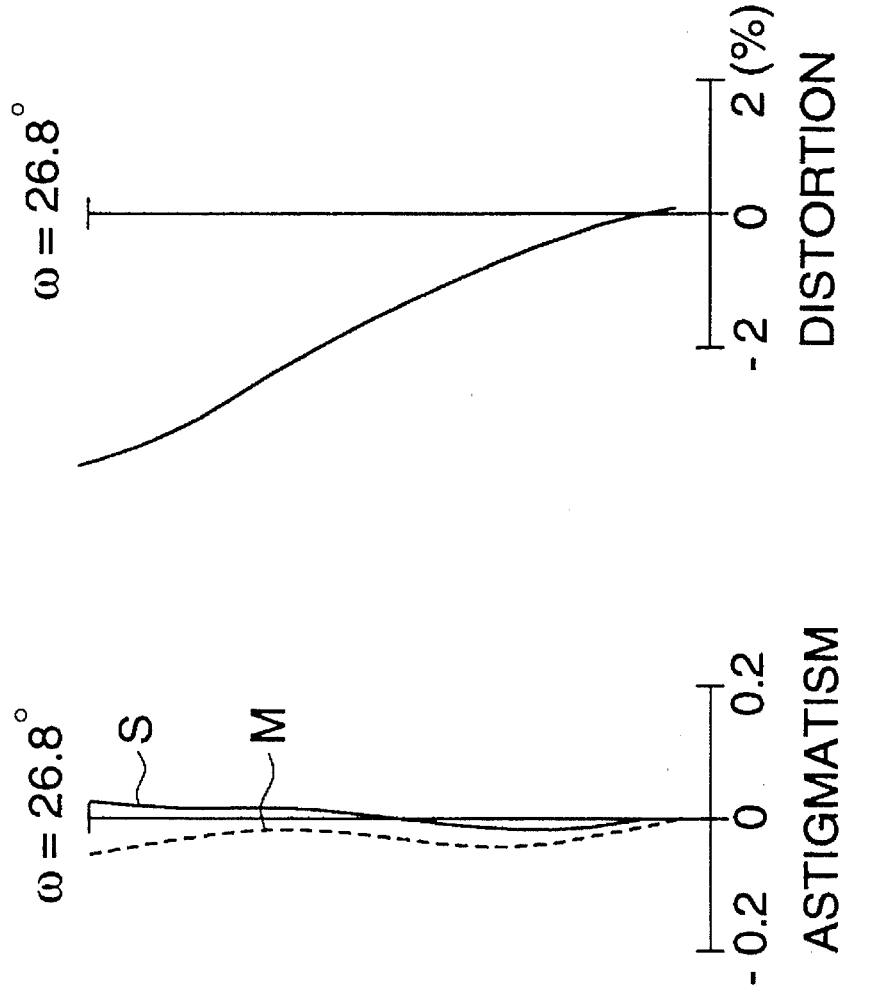
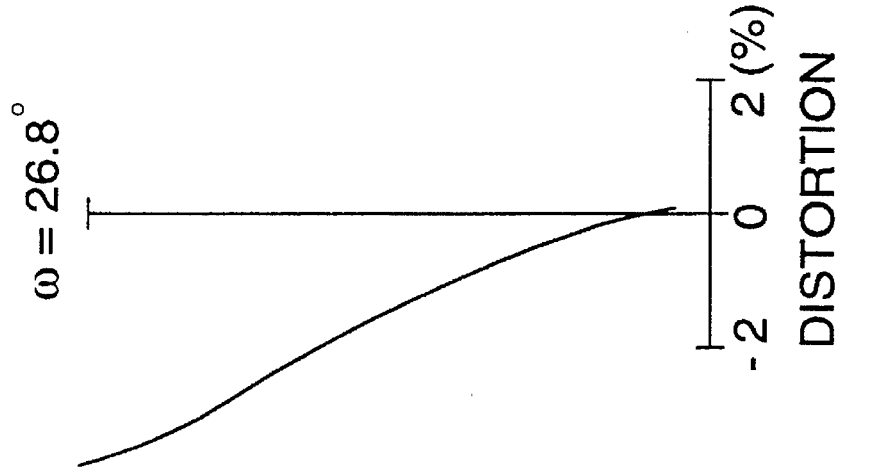

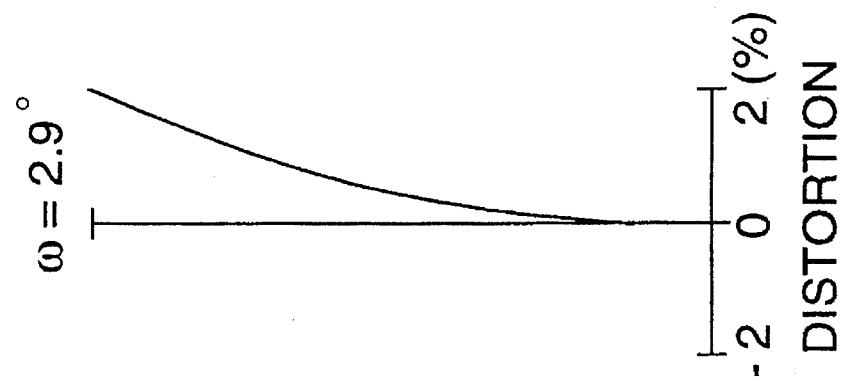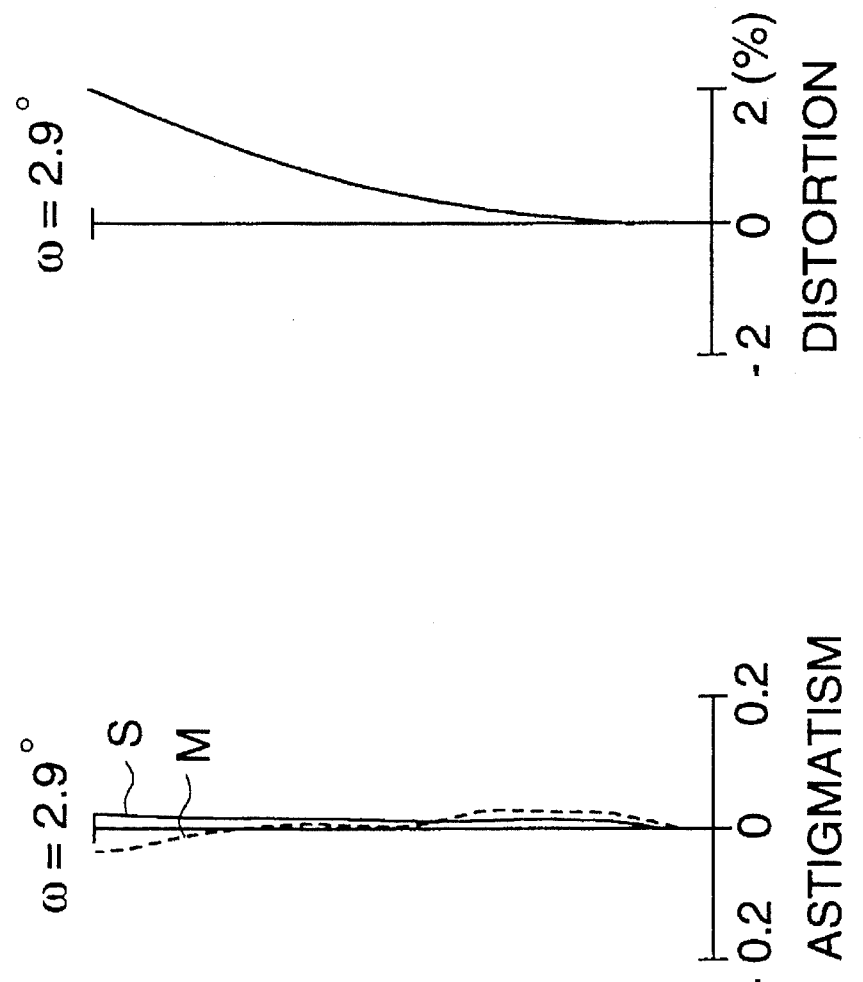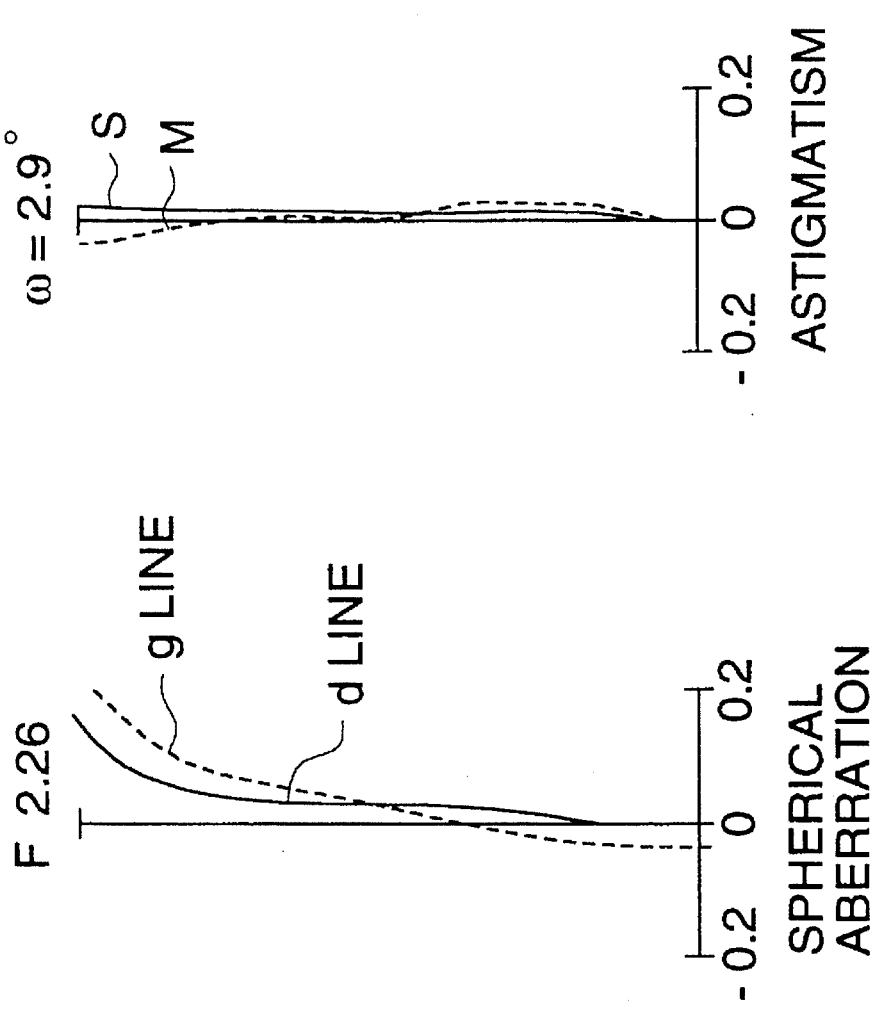

FIG. 18 (A) F 1.44, g LINE, d LINE, SPHERICAL ABERRATION

FIG. 18 (B) ω = 29.1°, S, M, ASTIGMATISM

FIG. 18 (C) ω = 29.1°, DISTORTION

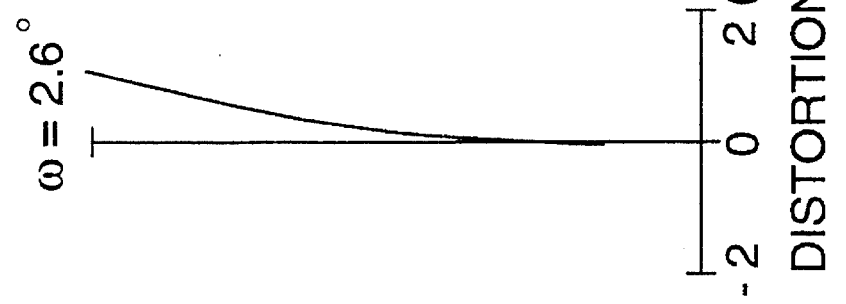
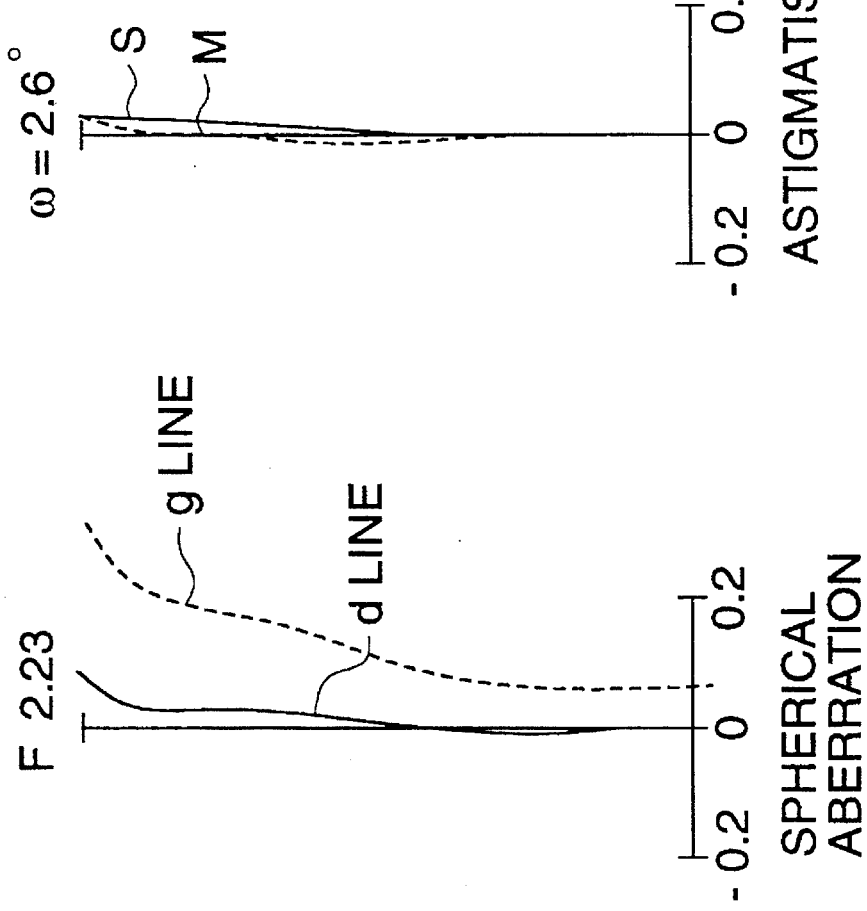

ZOOM LENS EMPLOYING PLASTIC LENSES

BACKGROUND OF THE INVENTION

The present invention relates to a zoom lens, and especially, to a zoom lens appropriate for video cameras, etc., which has a small F-number of 1.4, a high magnification ratio of 10 through 12, and is low cost.

A zoom lens which has groups of lenses having the order of positive-negative-positive-positive lens groups from the object side, and in which the second lens group has a variable magnification function, and the fourth lens group has a function of compensating for image plane movement caused by magnification change, has been disclosed by the present applicant (Japanese Patent Publication Open to Public Inspection No. 264902/1993). In this application, an example in which three elements of plastic lenses have been used as part of a 12 element lens has been disclosed. Further, the cost of the zoom lens has been further decreased as disclosed in Japanese Patent Publication Open to Public Inspection No. 180424/1994; and 5 elements of plastic lenses have been used as part of an 11 element lenses. Further decrease in cost of such types of zoom lenses is highly desired now.

On the other hand, it has been widely known that the number of lenses is decreased by using molded glass aspheric lenses. However, the cost of the aspheric lenses is currently still high, and actually, the cost of the zoom lens can not yet be decreased by the decrease of the number of lenses.

It could be assumed to use a larger number of plastic lenses as a means of further decreasing the cost of zoom lenses. However, generally, the refractive index of plastic lenses is lower than that of inorganic glass lenses, and kinds of plastic lenses are limited. Accordingly, it is difficult to compose a compact total lens system. Since it is difficult to conduct highly effective anti-reflection coating on plastic lenses, there are problems in which the loss of amount of light becomes large due to reflection from the lens surfaces, and the like.

SUMMARY OF THE INVENTION

An object of the present invention is to provide a zoom lens having a high magnification ratio of about 10 through 12 and a F-number of about F 1.4, which are preferable for a small-sized video camera, and having compactness and also a use of a large number of plastic lenses, wherein the cost of the zoom lens is much less compared with conventional lenses.

The above-described objective can be accomplished by the following means.

The first embodiment shows a zoom lens characterized in that the zoom lens has, in order from the object side, the first lens group having a positive refractive power, the second lens group which has a negative refractive power and is movable for magnification change, the third lens group which has a positive refractive power and is fixed, and the fourth lens group which has a positive refractive power and compensates for changes of position of the image plane during the magnification change. The fourth lens group has at least two positive lenses and at least one negative lens, and at least two plastic lenses are used in the fourth lens group, and at least two plastic lenses of the above-described plastic lenses are cemented.

The second embodiment shows the zoom lens described in the first embodiment characterized in that the zoom lens is composed of, in order from the object side, a biconvex lens, a bicancave lens, and a biconvex lens, and has at least one aspherical surface in the fourth lens group.

The third embodiment shows a zoom lens characterized in that the zoom lens has, in order from the object side, the first lens group having a positive refractive power, the second lens group having a negative refractive power and which is movable for magnification change, the third lens group having a positive refractive power and being fixed, and the fourth lens group having a positive refractive power and compensating for changes of position of the image plane during the magnification change. The second lens group is composed of, in order from the object side, a negative lens having a smaller radius of curvature facing the image side, a biconcave plastic lens, and a positive plastic lens, and the above-described two plastic lenses cemented together.

The fourth embodiment is the zoom lens described in the third embodiment characterized in that at least one surface of the plastic lenses in the second lens group is aspherical.

The fifth embodiment shows the zoom lens described in any of the first through the fourth embodiments which is characterized in that the zoom lens satisfies the following conditions:

① ... $0.8 < |f_2|/f_W < 1.6$

② ... $n_{21} > 1.60$

③ ... $v_{4P} - v_{4N} > 15$ where, $f_2$; a focal length of the second lens group $f_W$; a focal length at the wide angle end of the entire lens system $n_{21}$; a refractive index of the lens, closest to the object side, in the second lens group $v_{4P}$; an average value of the Abbe's number of positive lenses in the fourth lens group $v_{4N}$; an average value of the Abbe's number of negative lenses in the fourth lens group.

In the zoom lens of the present invention, a larger number of plastic lenses are used for the second and the fourth lens groups as compared with conventional zoom lenses, and the cost of such zoom lenses is lowered. Here, generally, it is difficult to achieve highly effective anti-reflection coating on plastic lenses, and losses of the amount of light becomes larger due to reflection on lens surfaces when a larger number of plastic lenses are used. In the present invention, when plastic lenses used in the second and the fourth lens groups are cemented in respective groups, the number of lens surfaces are decreased as much as possible, and the loss of the amount of light is kept to a minimum. Further, when plastic lenses are cemented, decentering between cemented lenses is prevented, which is a subsidiary effect. However, when the number of lens surfaces is decreased by cementing plastic lenses, the degree of freedom of the lens design is reduced, resulting in difficulty in aberration compensation, which is disadvantageous.

In the zoom lens described in the first and second embodiments, it is preferable that at least one aspherical surface is provided in the fourth lens group so that a degree of freedom is secured and aberrations are corrected. Specifically, when the aspherical surface is used in the fourth lens group, mainly coma and astigmatism can be satisfactorily compensated for.

In the zoom lens described in the third and fourth embodiments, it is preferable that at least one aspherical surface is provided in the second lens group so that a degree of freedom of lens design is assured and aberrations are corrected. Specifically, when an aspherical surface is provided in the second lens group, variations of distortion and spherical aberration due to magnification change can be reduced.

The zoom lens described in the fifth embodiment will be explained for each conditional expression below. The conditional expression ① relates to a refractive power of the second lens group. When the upper limit of the conditional expression ① is exceeded, the movement amount of lenses is increased and the total length of the zoom lens due to magnification change becomes too great, when a magnification ratio of 10 through 12 is required. When the lower limit of the conditional expression ① is exceeded, variations of aberration due to magnification change become large, and it is difficult to maintain the optical performance of the lenses. Specifically, even when an aspherical surface is provided in lenses, variations of coma at the wide angle end and at the telescopic angle end are too large and so can not be compensated for. In the conditional expression ①, it is preferable that the lower limit of 1.0 is exceeded and the upper limit of 1.4 is exceeded.

The conditional expression ② makes up for the conditional expression ①, and regulates a refractive index of the negative lens which is arranged at the position closest to the object side. The second negative lens from the object side in the second lens group is made of plastic. Accordingly, the refractive index of the lens is low and the Petzval's sum tends to be large in the negative direction. Therefore, it is preferable that a lens having a comparatively high refractive index is used for a negative lens arranged in the position closest to the object side in the second lens group. That is, when the conditional expression ② is not satisfied, Petzval's sum of the entire lens system is shifted in the negative direction and especially, the sagittal image surface at the wide angle end is located at a position excessively distant from the image plane in the direction leaving the object, when the refractive power of the second lens group is increased so that the entire length of the zoom lens can be kept compact. In the conditional expression ②, it is preferable that the lower limit of 1.70 is exceeded.

The conditional expression ③ is a condition to satisfactorily compensate for chromatic aberration. When the condition is not satisfied, the chromatic aberration is not fully compensated for by the fourth lens group, the axial chromatic aberration becomes larger in the direction in which the image forming position of g line is closer to the object than that of d line on the optical axis, and transverse chromatic aberration becomes larger in the direction in which the image height of g line is smaller than that of d line. In the conditional expression ③, it is preferable that the lower limit of 20 is exceeded.

Specifically, in the zoom lens of the present invention, the first lens group is composed of: a doublet in which, in order from the object side, a negative meniscus lens, the concave surface of which faces the image surface, and a positive single lens, the convex surface of which has a smaller radius of curvature and faces the object side, are cemented or arranged with a slight air gap; and a positive meniscus single lens, the convex surface of which faces the object side. The third lens group is composed of a positive plastic lens and includes at least an aspherical surface.

BRIEF DESCRIPTION OF THE DRAWINGS

FIGS. 2(A), 2(B) and 2(C) are views showing each characteristic of a zoom lens at the wide angle end in the first embodiment. In this case, FIG. 2(A) shows spherical aberration, FIG. 2(B) shows astigmatism, and FIG. 2(C) shows distortion aberration.

FIG. 3(A) shows spherical aberration, FIG. 3(B) shows astigmatism, and FIG. 3(C) shows distortion aberration.

FIG. 4(A) shows spherical aberration, FIG. 4(B) shows astigmatism, and FIG. 4(C) shows distortion aberration.

FIGS. 6(A), 6(B) and 6(C) are views showing each characteristic of the zoom lens at the wide angle end in the second embodiment. In this case, FIG. 6(A) shows spherical aberration, FIG. 6(B) shows astigmatism, and FIG. 6(C) shows distortion aberration.

FIG. 7(A) shows spherical aberration, FIG. 7(B) shows astigmatism, and FIG. 7(C) shows distortion aberration.

FIGS. 8(A), 8(B) and 8(C) are views showing each characteristic of the zoom lens at the telescopic angle end in the second embodiment. In this case, FIG. 8(A) shows spherical aberration, FIG. 8(B) shows astigmatism, and FIG. 8(C) shows distortion aberration.

FIG. 10(A) shows spherical aberration, FIG. 10(B) shows astigmatism, and FIG. 10(C) shows distortion aberration.

FIG. 11(A) shows spherical aberration, FIG. 11(B) shows astigmatism, and FIG. 11(C) shows distortion aberration.

FIG. 12(A) shows spherical aberration, FIG. 12(B) shows astigmatism, and FIG. 12(C) shows distortion aberration.

FIG. 14(A) shows spherical aberration, FIG. 14(B) shows astigmatism, and FIG. 14(C) shows distortion aberration.

FIG. 15(A) shows spherical aberration, FIG. 15(B) shows astigmatism, and FIG. 15(C) shows distortion aberration.

FIG. 16(A) shows spherical aberration, FIG. 16(B) shows astigmatism, and FIG. 16(C) shows distortion aberration.

FIG. 18(A) shows spherical aberration, FIG. 18(B) shows astigmatism, and FIG. 18(C) shows distortion aberration.

FIG. 19(A) shows spherical aberration, FIG. 19(B) shows astigmatism, and FIG. 19(C) shows distortion aberration.

FIGS. 20(A), 20(B) and 20(C) are views showing each characteristic of the zoom lens at the telescopic angle end in the second embodiment. In this case, FIG. 20(A) shows spherical aberration, FIG. 20(B) shows astigmatism, and FIG. 20(C) shows distortion aberration.

DETAILED DESCRIPTION OF THE PREFERRED EMBODIMENT

Figure 1:
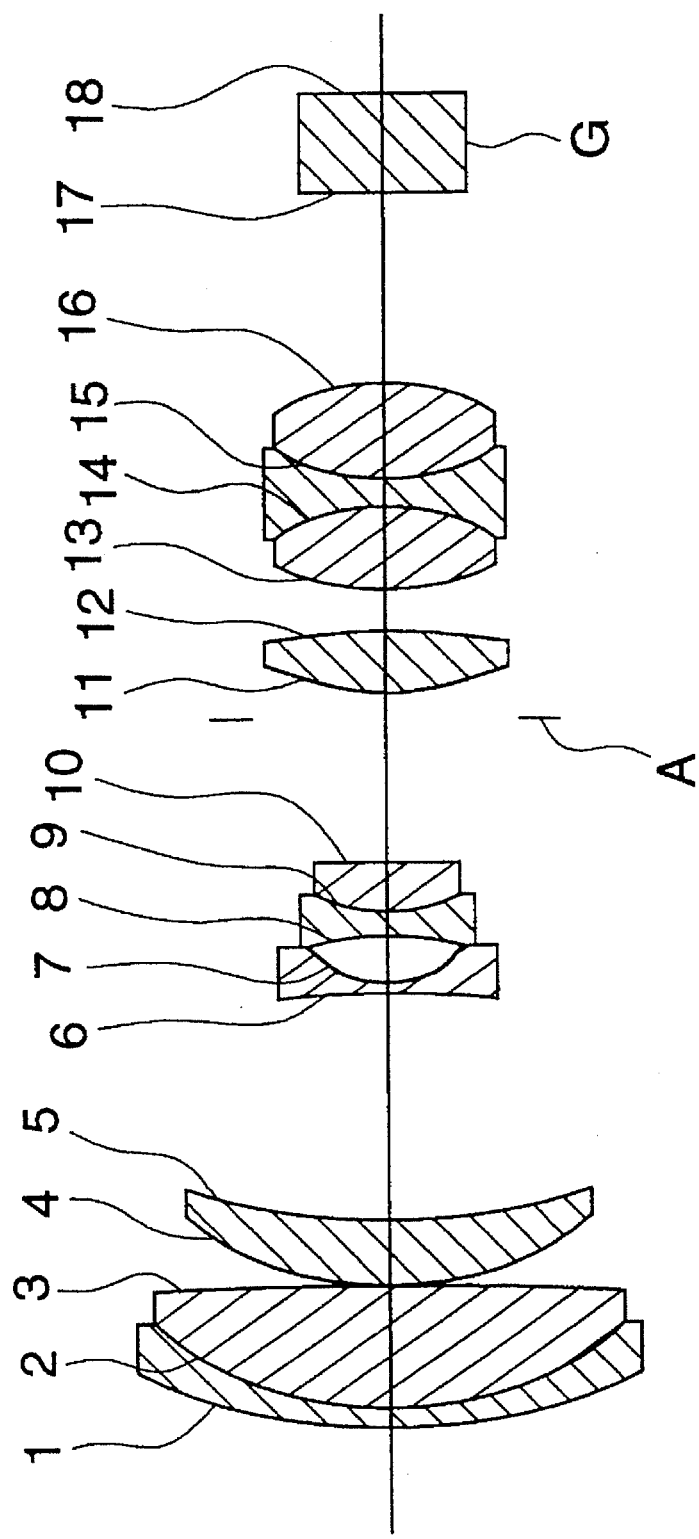
FIG. 1 is a cross sectional view of an optical system of a lens group in the first embodiment. In the drawing, numerals 1 through 18 express respectively the surface numbers from the object, G expresses a cover glass and A expresses an aperture.

According to cross sectional views of optical systems of lens systems having structures as shown in FIG. 1, FIG. 5, FIG. 9, FIG. 13, and FIG. 17, the present invention will be described in detail below.

The lens system according to the present invention is composed of, in order from the object side, the first lens group having a positive refractive power, the second lens group which has a refractive power and is movable for magnification change, the fixed third lens group which has a positive refractive power, and the fourth lens group which has a positive refractive power and compensates for changes of position of image surfaces at the time of magnification change.

An example which satisfies the above-described conditions is shown below. Here, R shows radius of curvature of each surface of the lenses. D shows the thickness of each lens or the distance between lenses. $N_d$ shows the refractive index of each lens, $v_d$ shows Abbe's number, and $2\omega$ shows the entire angle of view. In a column $n_d$, [*] denotes plastic.

The shape of the aspherical surface is expressed by the following [Equation 1].

$$x = \frac{y^2/r}{1+\sqrt{1-(K+1)y^2/r^2}} + A_1 y^4 + A_2 y^6 + A_3 y^8 + A_4 y^{10} \quad \text{[Equation 1]}$$

where x: A coordinate forwarded to the image side from the object side along the optical axis in which the vertex of the aspherical surface is defined as an origin, y: A coordinate perpendicular to the optical axis in which the vertex of the aspherical surface is defined as the origin, r: A paraxial radius of curvature of the aspherical surface, K: A conical constant of the surface, $A_1, A_2, A_3, A_4$: Aspherical surface coefficients

[Example 1]

f = 4.33 – 49.39  2ω = 58.0° – 5.6°  |f2|/f_w = 1.21

| | R | D | $n_d$ | $v_d$ | |
|---|---|---|---|---|---|
| 1 | 38.013 | 0.80 | 1.84666 | 23.8 | A component of the first lens group |
| 2 | 20.250 | 6.10 | 1.69680 | 55.5 | A component of the first lens group |
| 3 | –233.449 | 0.20 | | | A component of the first lens group |
| 4 | 17.672 | 3.20 | *1.49960 | 56.1 | A component of the first lens group |
| 5 | 38.993 | a | | | A component of the first lens group |
| 6 | –57.362 | 0.55 | 1.72916 | 54.7 | A component of the second lens group |
| 7 | 4.958 | 2.65 | | | A component of the second lens group |
| 8 | –9.687 | 1.10 | *1.51000 | 55.8 | A component of the second lens group |
| 9 | 7.272 | 2.40 | *1.58300 | 30.0 | A component of the second lens group |
| 10 | –39.880 | b | | | A component of the second lens group |
| 11 | 16.493 | 2.90 | *1.49960 | 56.1 | A component of the third lens group |
| 12 | –40.095 | c | | | A component of the third lens group |
| 13 | 14.509 | 4.70 | *1.49960 | 56.1 | A component of the fourth lens group |
| 14 | –9.866 | 1.30 | *1.58300 | 30.0 | A component of the fourth lens group |
| 15 | 10.776 | 4.70 | *1.49960 | 56.1 | A component of the fourth lens group |
| 16 | –10.460 | d | | | A component of the fourth lens group |
| 17 | ∞ | 4.90 | 1.51633 | 64.1 | Cover glass |
| 18 | ∞ | | | | Cover glass |

| Variable space | | | | |
|---|---|---|---|---|
| f | a | b | c | d |
| 4.33 | 1.10 | 19.60 | 5.85 | 6.70 |
| 14.65 | 11.61 | 9.09 | 2.66 | 9.89 |
| 49.39 | 17.70 | 3.00 | 5.05 | 7.50 |

Aspherical surface coefficient of the eighth surface $K = -1.2483 \times 10^0$
$A_1 = 4.0978 \times 10^{-4}$
$A_2 = -1.0641 \times 10^{-5}$
$A_3 = 2.5994 \times 10^{-7}$
$A_4 = 0$ Aspherical surface coefficient of the tenth surface $K = 2.2080 \times 10^{-3}$
$A_1 = -1.7389 \times 10^{-5}$
$A_2 = 1.0534 \times 10^{-5}$
$A_3 = -2.5511 \times 10^{-6}$
$A_4 = 1.0458 \times 10^{-7}$ Aspherical surface coefficient of the 11th surface $K = -2.9170 \times 10^0$
$A_1 = 5.1991 \times 10^{-5}$
$A_2 = 1.5165 \times 10^{-6}$
$A_3 = -9.6374 \times 10^{-8}$
$A_4 = 1.3842 \times 10^{-9}$ Aspherical surface coefficient of the 13th surface $K = -2.0522 \times 10^{-1}$
$A_1 = -1.4210 \times 10^{-4}$
$A_2 = -1.1186 \times 10^{-6}$
$A_3 = 2.9435 \times 10^{-8}$
$A_4 = -2.5033 \times 10^{-10}$ Aspherical surface coefficient of the 16th surface $K = -2.1247 \times 10^{-1}$
$A_1 = 1.5486 \times 10^{-4}$
$A_2 = -1.1866 \times 10^{-6}$
$A_3 = 4.4687 \times 10^{-8}$
$A_4 = -7.8601 \times 10^{-10}$.

[Example 2]

f = 4.33 – 44.11  2ω = 53.6° – 5.8°  |f2|/f_w = 1.20

| | R | D | $n_d$ | $v_d$ | |
|---|---|---|---|---|---|
| 1 | 43.975 | 1.20 | *1.58300 | 30.0 | A component of the first lens group |

-continued

| | | | | | |
|---|---|---|---|---|---|
| 2 | 16.758 | 0.20 | | | A component of the first lens group |
| 3 | 16.927 | 6.80 | 1.48749 | 70.2 | A component of the first lens group |
| 4 | −62.088 | 0.20 | | | A component of the first lens group |
| 5 | 17.233 | 3.10 | *1.52540 | 56.3 | A component of the first lens group |
| 6 | 48.592 | a | | | A component of the second lens group |
| 7 | −62.078 | 0.55 | 1.72916 | 54.7 | A component of the second lens group |
| 8 | 5.100 | 2.35 | | | A component of the second lens group |
| 9 | −10.304 | 1.20 | *1.52540 | 56.3 | A component of the second lens group |
| 10 | 7.348 | 2.40 | *1.58300 | 30.0 | A component of the second lens group |
| 11 | −33.796 | b | | | A component of the third lens group |
| 12 | 14.856 | 2.90 | *1.49200 | 57.0 | A component of the third lens group |
| 13 | −50.000 | c | | | A component of the fourth lens group |
| 14 | 16.187 | 4.50 | *1.52540 | 56.3 | A component of the fourth lens group |
| 15 | −10.192 | 1.30 | *1.58340 | 30.0 | A component of the fourth lens group |
| 16 | 11.140 | 4.30 | *1.52540 | 56.3 | A component of the fourth lens group |
| 17 | −12.758 | d | | | Cover glass |
| 18 | ∞ | 4.90 | 1.51633 | 64.1 | Cover glass |
| 19 | ∞ | | | | |

Variable space

| f | a | b | c | d |
|---|---|---|---|---|
| 4.63 | 1.00 | 19.20 | 5.97 | 7.08 |
| 14.82 | 11.06 | 9.14 | 2.88 | 10.17 |
| 44.11 | 16.90 | 3.30 | 4.92 | 8.13 |

Aspherical surface coefficient of the ninth surface $K = -1.0389 \times 10^0$
$A_1 = 5.6732 \times 10^{-5}$
$A_2 = 5.6748 \times 10^{-6}$
$A_3 = -7.2019 \times 10^{-7}$
$A_4 = 0$ Aspherical surface coefficient of the 11th surface $K = 4.4193 \times 10^{-3}$
$A_1 = -9.4066 \times 10^{-5}$
$A_2 = -9.8544 \times 10^{-6}$
$A_3 = 1.2782 \times 10^{-8}$
$A_4 = 6.6205 \times 10^{-9}$ Aspherical surface coefficient of the 12th surface $K = -2.6747 \times 10^0$
$A_1 = 5.0118 \times 10^{-5}$
$A_2 = 1.5318 \times 10^{-6}$
$A_3 = -1.0196 \times 10^{-7}$
$A_4 = 1.3842 \times 10^{-9}$ Aspherical surface coefficient of the 14th surface $K = -9.0173 \times 10^{-2}$
$A_1 = -8.3787 \times 10^{-5}$
$A_2 = -2.1086 \times 10^{-6}$
$A_3 = 1.2849 \times 10^{-7}$
$A_4 = -1.7031 \times 10^{-9}$ Aspherical surface coefficient of the 17th surface $K = -1.9878 \times 10^{-1}$
$A_1 = 1.5208 \times 10^{-4}$
$A_2 = 1.3108 \times 10^{-7}$
$A_3 = 2.7325 \times 10^{-8}$
$A_4 = -5.6530 \times 10^{-10}$.

[Example 3]
$f = 4.63 - 44.11$  $2\omega = 53.6° - 5.8°$  $|f2|/f_w = 1.18$

-continued

| | R | D | $n_d$ | $v_d$ | |
|---|---|---|---|---|---|
| 1 | 38.842 | 0.80 | 1.84666 | 23.8 | A component of the first lens group |
| 2 | 19.541 | 0.20 | | | A component of the first lens group |
| 3 | 19.580 | 6.10 | *1.52540 | 56.3 | A component of the first lens group |
| 4 | −57.277 | 0.20 | | | A component of the first lens group |
| 5 | 16.078 | 3.25 | *1.52540 | 56.3 | A component of the first lens group |
| 6 | 46.244 | a | | | A component of the second lens group |
| 7 | −55.154 | 0.55 | 1.72916 | 54.7 | A component of the second lens group |
| 8 | 5.080 | 2.45 | | | A component of the second lens group |
| 9 | −10.188 | 1.20 | *1.52540 | 56.3 | A component of the second lens group |
| 10 | 7.225 | 2.40 | *1.58300 | 30.0 | A component of the second lens group |
| 11 | −33.790 | b | | | A component of the third lens group |
| 12 | 16.373 | 2.80 | *1.49200 | 57.0 | A component of the third lens group |
| 13 | −59.378 | c | | | A component of the fourth lens group |
| 14 | 15.962 | 4.50 | *1.52540 | 56.3 | A component of the fourth lens group |
| 15 | −9.973 | 1.30 | *1.58300 | 30.0 | A component of the fourth lens group |
| 16 | 10.873 | 4.30 | *1.52540 | 56.3 | A component of the fourth lens group |
| 17 | −11.894 | d | | | Cover glass |
| 18 | ∞ | 4.90 | 1.51633 | 64.1 | Cover glass |
| 19 | ∞ | | | | |

Variable space

| f | a | b | c | d |
|---|---|---|---|---|
| 4.63 | 1.00 | 18.60 | 5.88 | 7.97 |
| 14.40 | 10.48 | 9.12 | 2.99 | 10.86 |
| 44.11 | 16.30 | 3.30 | 5.41 | 8.44 |

Aspherical surface coefficient of the ninth surface $K = -1.1468 \times 10^0$
$A_1 = -4.8735 \times 10^{-5}$
$A_2 = 2.0382 \times 10^{-5}$
$A_3 = -1.0901 \times 10^{-6}$
$A_4 = 0$ Aspherical surface coefficient of the 11th surface $K = 3.1183 \times 10^{-3}$
$A_1 = -1.3061 \times 10^{-4}$
$A_2 = -1.7009 \times 10^{-6}$
$A_3 = -6.3024 \times 10^{-7}$
$A_4 = 3.1802 \times 10^{-8}$ Aspherical surface coefficient of the 12th surface $K = -2.6485 \times 10^0$
$A_1 = 7.5679 \times 10^{-5}$
$A_2 = -2.9367 \times 10^{-7}$
$A_3 = -8.0807 \times 10^{-8}$
$A_4 = 1.3842 \times 10^{-9}$ Aspherical surface coefficient of the 14th surface $K = -2.2627 \times 10^{-1}$
$A_1 = -1.3970 \times 10^{-4}$
$A_2 = -5.6784 \times 10^{-7}$
$A_3 = 1.1746 \times 10^{-7}$
$A_4 = -1.7301 \times 10^{-9}$ Aspherical surface coefficient of the 17th surface $K = -5.9759 \times 10^{-2}$
$A_1 = 1.0373 \times 10^{-4}$
$A_2 = 1.6624 \times 10^{-6}$ $A_3 = 2.4600 \times 10^{-8}$
$A_4 = -7.8601 \times 10^{-10}$.

[Example 4]
f = 4.63 – 44.11  2ω = 53.6° – 5.8°  |f2|/f_w = 1.22

|   | R | D | $n_d$ | $\nu_d$ | |
|---|---|---|---|---|---|
| 1 | 46.200 | 1.20 | *1.58300 | 30.0 | A component of the first lens group |
| 2 | 15.243 | 7.50 | *1.52540 | 56.3 | A component of the first lens group |
| 3 | –68.530 | 0.20 | | | A component of the first lens group |
| 4 | 16.191 | 3.00 | 1.48749 | 70.2 | A component of the first lens group |
| 5 | 41.272 | a | | | A component of the first lens group |
| 6 | –82.963 | 0.55 | 1.72916 | 54.7 | A component of the second lens group |
| 7 | 5.157 | 2.45 | | | A component of the second lens group |
| 8 | –10.238 | 1.20 | *1.52540 | 56.3 | A component of the second lens group |
| 9 | 7.258 | 2.40 | *1.58300 | 30.0 | A component of the second lens group |
| 10 | –34.737 | b | | | A component of the second lens group |
| 11 | 16.256 | 2.80 | *1.49200 | 57.0 | A component of the third lens group |
| 12 | –50.000 | c | | | A component of the third lens group |
| 13 | 16.387 | 4.30 | *1.52540 | 56.3 | A component of the fourth lens group |
| 14 | –10.107 | 1.30 | *1.58300 | 30.0 | A component of the fourth lens group |
| 15 | 11.047 | 4.60 | *1.52540 | 56.3 | A component of the fourth lens group |
| 16 | –11.397 | d | | | A component of the fourth lens group |
| 17 | ∞ | 4.90 | 1.51633 | 64.1 | Cover glass |
| 18 | ∞ | | | | Cover glass |

Variable space

| f | a | b | c | d |
|---|---|---|---|---|
| 4.63 | 1.00 | 19.10 | 5.70 | 7.25 |
| 14.75 | 11.00 | 9.10 | 3.00 | 9.95 |
| 44.11 | 16.80 | 3.30 | 5.34 | 7.61 |

Aspherical surface coefficient of the third surface $K = -9.628810^{-3}$
$A_1 = 1.3430 \times 10^{-6}$
$A_2 = -9.560010^{-9}$
$A_3 = 1.0825 \times 10^{-1}$
$A_4 = 0$ Aspherical surface coefficient of the eighth surface $K = -1.1619 \times 10^0$
$A_1 = 7.5069 \times 10^{-6}$
$A_2 = -4.0615 \times 10^{-6}$
$A_3 = 1.8980 \times 10^{-7}$
$A_4 = -2.3593 \times 10^{-8}$ Aspherical surface coefficient of the tenth surface $K = 2.8350 \times 10^{-3}$
$A_1 = -1.2969 \times 10^{-4}$
$A_2 = -4.1537 \times 10^{-6}$
$A_3 = -3.1595 \times 10^{-7}$
$A_4 = 1.3782 \times 10^{-8}$ Aspherical surface coefficient of the 11th surface $K = -2.7960 \times 10^0$
$A_1 = 5.5789 \times 10^{-5}$
$A_2 = 2.3456 \times 10^{-7}$
$A_3 = -6.8684 \times 10^{-8}$
$A_4 = 1.1339 \times 10^{-9}$ Aspherical surface coefficient of the 13th surface $K = -1.6836 \times 10^{-1}$
$A_1 = -1.1359 \times 10^{-4}$
$A_2 = -1.2646 \times 10^{-6}$
$A_3 = 7.3131 \times 10^{-8}$
$A_4 = -8.8392 \times 10^{-10}$ Aspherical surface coefficient of the 16th surface $K = -2.0647 \times 10^{-1}$
$A_1 = 1.5689 \times 10^{-4}$
$A_2 = -1.1925 \times 10^{-6}$
$A_3 = 5.4109 \times 10^{-8}$
$A_4 = -7.8601 \times 10^{-10}$.

[Example 5]
f = 4.33 – 49.39  2ω = 58.2° – 5.2°  |f2|/f_w = 1.21

|   | R | D | $n_d$ | $\nu_d$ | |
|---|---|---|---|---|---|
| 1 | 38.656 | 0.80 | 1.84666 | 23.8 | A component of the first lens group |
| 2 | 20.391 | 6.10 | 1.69680 | 55.5 | A component of the first lens group |
| 3 | –213.013 | 0.20 | | | A component of the first lens group |
| 4 | 17.355 | 3.20 | *1.49960 | 56.1 | A component of the first lens group |
| 5 | 37.425 | a | | | A component of the first lens group |
| 6 | –57.172 | 0.55 | 1.72916 | 54.7 | A component of the second lens group |
| 7 | 4.980 | 2.65 | | | A component of the second lens group |
| 8 | –9.690 | 1.10 | *1.51000 | 55.8 | A component of the second lens group |
| 9 | 7.329 | 2.40 | *1.58300 | 30.0 | A component of the second lens group |
| 10 | –40.049 | b | | | A component of the second lens group |
| 11 | 16.483 | 2.90 | *1.49960 | 56.1 | A component of the third lens group |
| 12 | –38.143 | c | | | A component of the third lens group |
| 13 | 14.382 | 4.30 | *1.49960 | 56.1 | A component of the fourth lens group |
| 14 | –10.384 | 1.30 | *1.58300 | 30.0 | A component of the fourth lens group |
| 15 | 10.857 | 0.20 | | | A component of the fourth lens group |
| 16 | 11.162 | 4.70 | 1.51823 | 59.0 | A component of the fourth lens group |
| 17 | –11.214 | d | | | Cover glass |
| 18 | ∞ | 4.90 | 1.51633 | 64.1 | Cover glass |
| 18 | ∞ | | | | |

Variable space

| f | a | b | c | d |
|---|---|---|---|---|
| 4.33 | 1.10 | 19.60 | 5.83 | 6.52 |
| 14.59 | 11.61 | 9.09 | 2.68 | 9.67 |
| 49.39 | 17.70 | 3.00 | 5.11 | 7.24 |

Aspherical surface coefficient of the eighth surface $K = -1.2395 \times 10^0$
$A_1 = 3.7213 \times 10^{-4}$
$A_2 = -8.4421 \times 10^{-6}$
$A_3 = 1.1979 \times 10^{-7}$
$A_4 = 0$ Aspherical surface coefficient of the tenth surface $K = 2.2281 \times 10^{-3}$
$A_1 = -2.569g \times 10^{-5}$
$A_2 = 1.2788 \times 10^{-5}$
$A_3 = -2.8369 \times 10^{-6}$
$A_4 = 1.1540 \times 10^{-7}$ Aspherical surface coefficient of the 11th surface $K = -3.027 \times 10^0$ -continued $A_1 = 3.5631 \times 10^{-5}$
$A_2 = 1.6795 \times 10^{-6}$
$A_3 = -9.1609 \times 10^{-8}$
$A_4 = 1.3842 \times 10^{-9}$ Aspherical surface coefficient of the 13th surface $K = 1.5072 \times 10^{-1}$
$A_1 = -3.2977 \times 10^{-5}$
$A_2 = -1.9378 \times 10^{-6}$
$A_3 = 8.8336 \times 10^{-9}$
$A_4 = -7.0606 \times 10^{-10}$ Aspherical surface coefficient of the 15th surface $K = 2.2954 \times 10^{-1}$
$A_1 = 2.3304 \times 10^{-4}$
$A_2 = -2.223g \times 10^{-6}$
$A_3 = 2.4016 \times 10^{-8}$
$A_4 = -1.7482 \times 10^{-9}$.

In Example 1 through Example 5, any of the aberrations is very satisfactorily compensated for as shown in the following views showing aberrations in each example, and excellent lens systems can be obtained.

Figure 3:
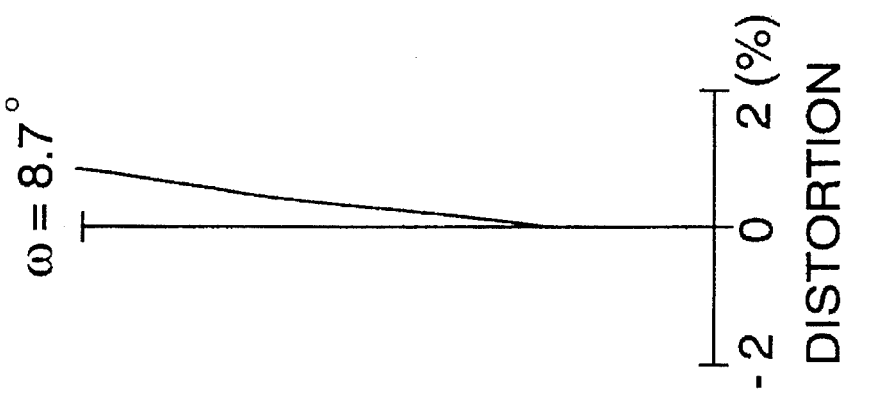
FIGS. 3(A), 3(B) and 3(C) are views showing each characteristic of the zoom lens at an intermediate range in the first embodiment. In this case.
Figure 3:
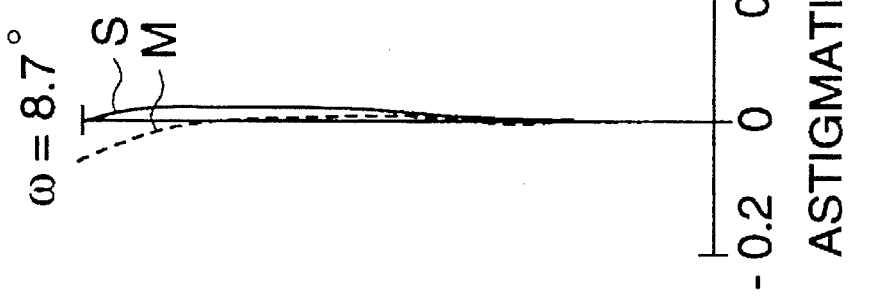
Figure 3:
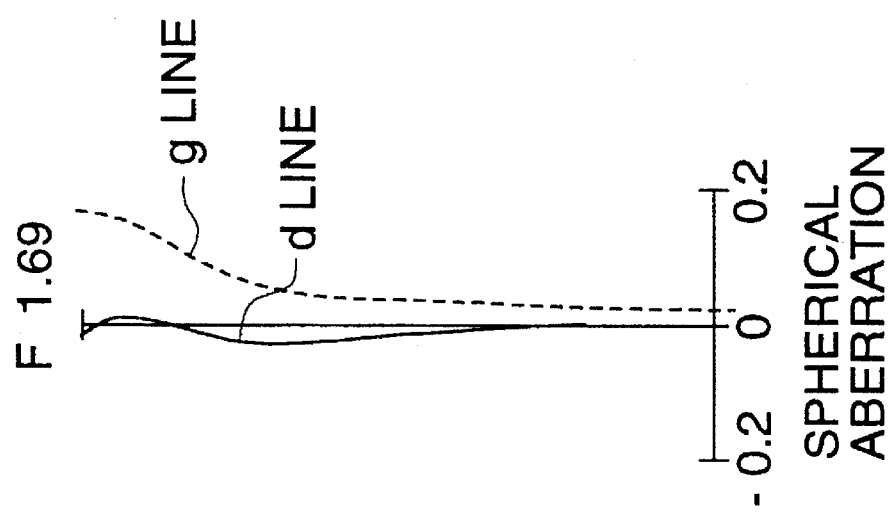
Figure 4:
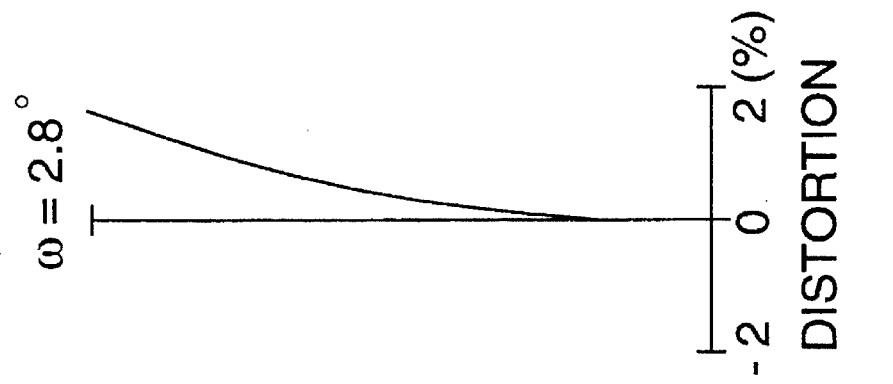
FIGS. 4(A), 4(B) and 4(C) are views showing each characteristic of the zoom lens at the telescopic end in the first embodiment. In this case.
Figure 4:
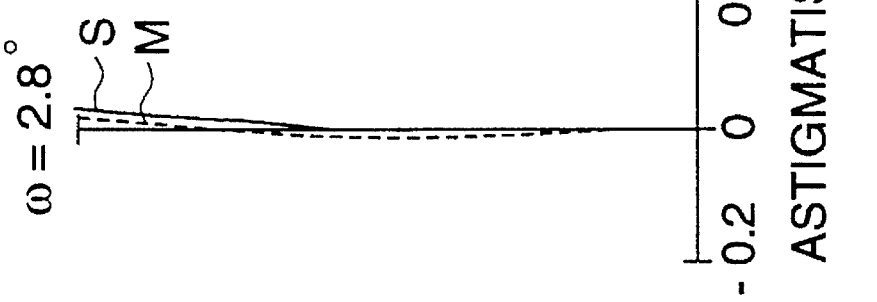
Figure 4:
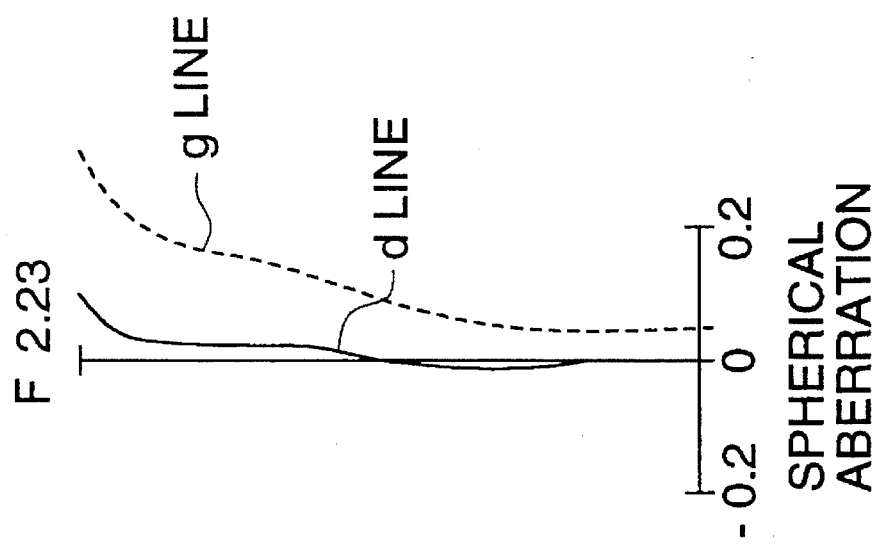
Figure 5:
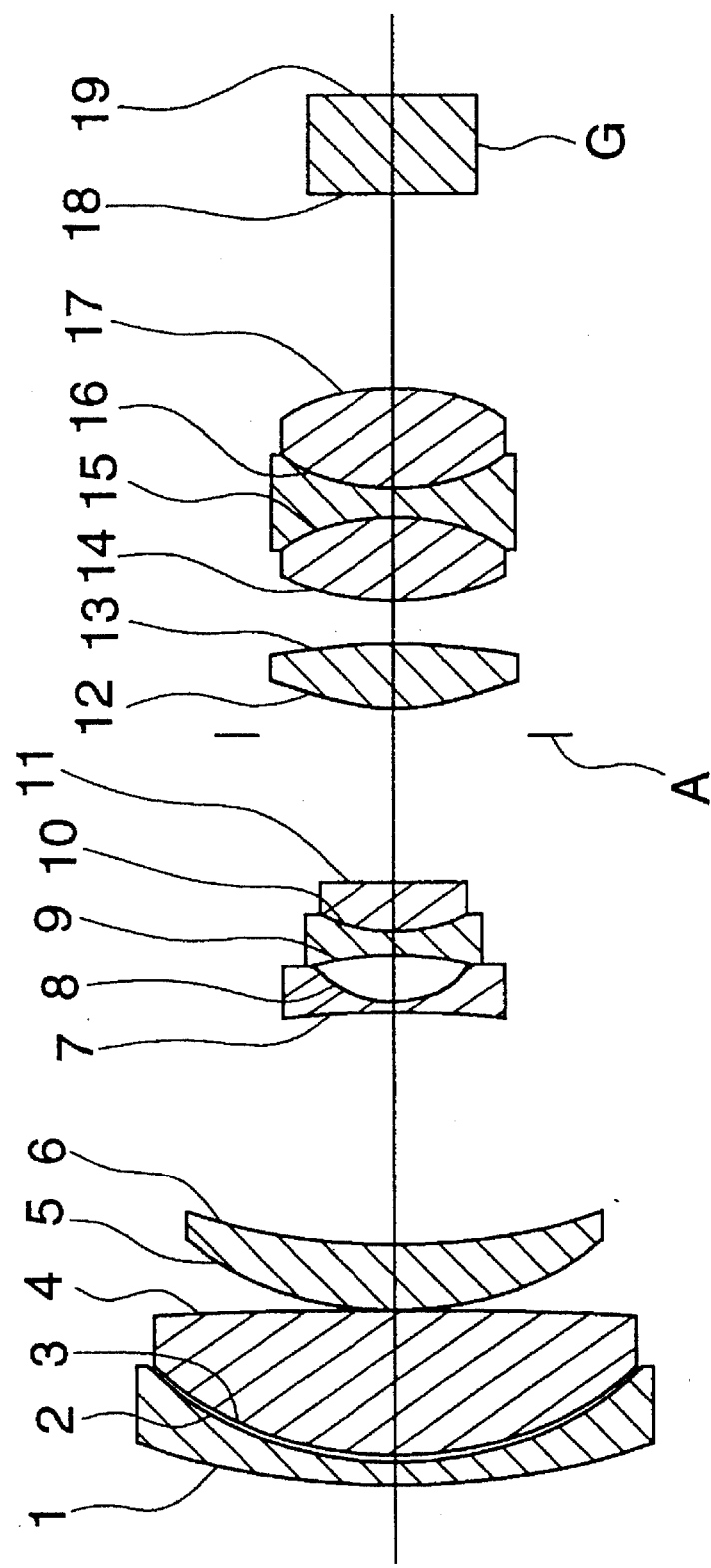
FIG. 5 is a cross sectional view of an optical system of a lens system in the second embodiment.

That is, at the wide angle end in Example 1, aberrations of the zoom lens of the present invention can be satisfactorily compensated for as shown by spherical aberration in FIG. 2(A), astigmatism in FIG. 2(B), and distortion aberration in FIG. 2(C). In the same way, at the intermediate range in Example 1, aberrations of the zoom lens can be satisfactorily compensated for as shown by FIG. 3(A), FIG. 3(B), and FIG. 3(C). At the telescopic end in Example 1, aberrations of the zoom lens can be satisfactorily compensated for as shown by FIG. 4(A), FIG. 4(B), and FIG. 4(C).

Figure 7:
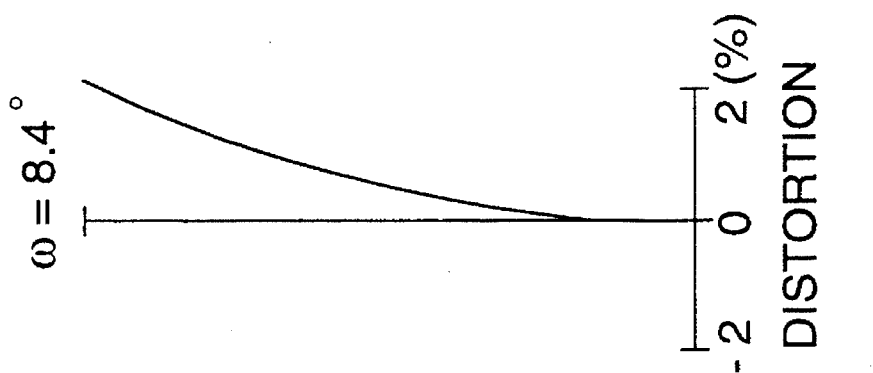
FIGS. 7(A), 7(B) and 7(C) are views showing each characteristic of the zoom lens at an intermediate range in the second embodiment. In this case.
Figure 7:
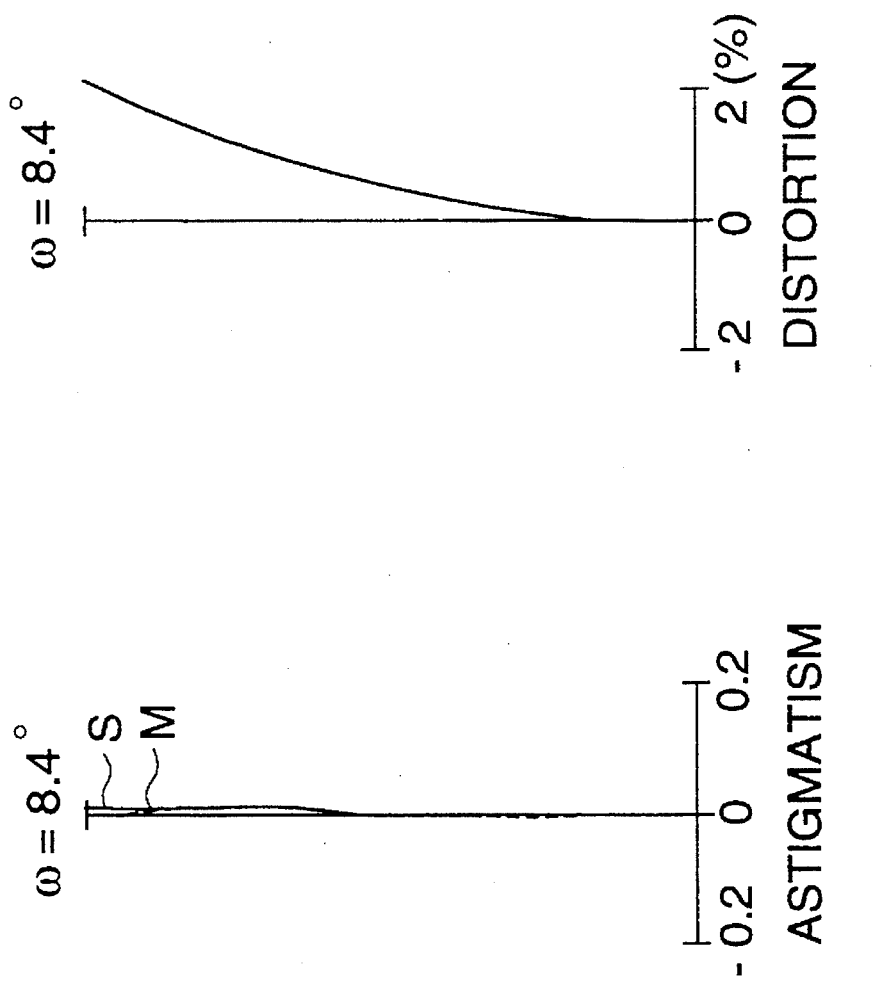
Figure 7:
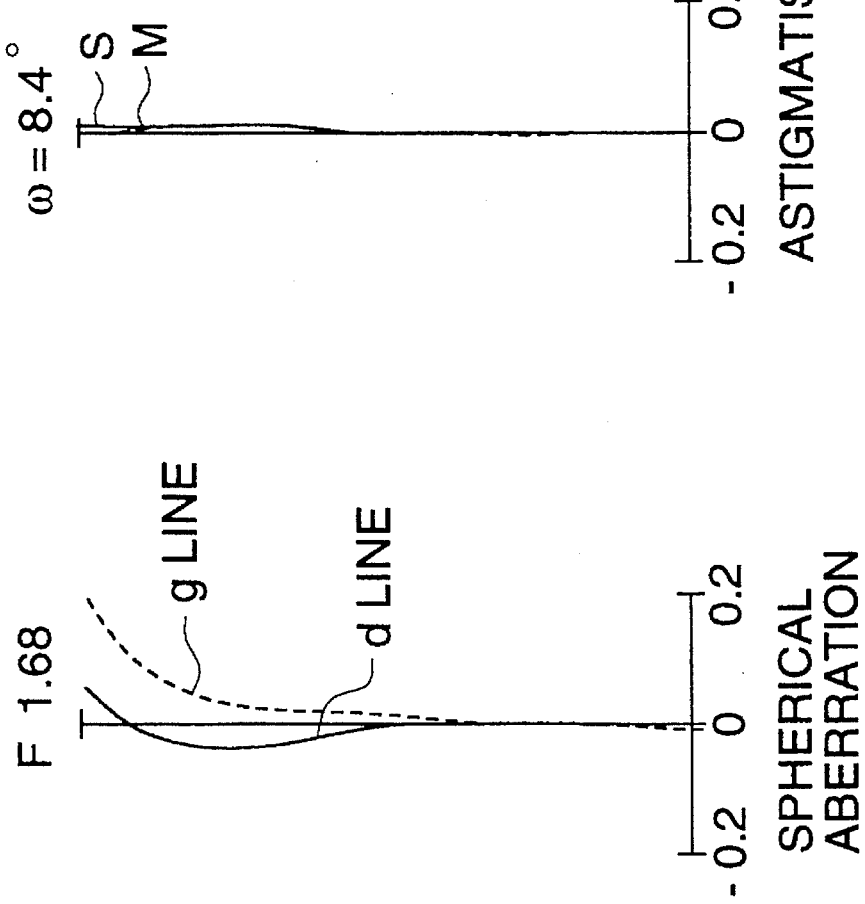
Figure 9:
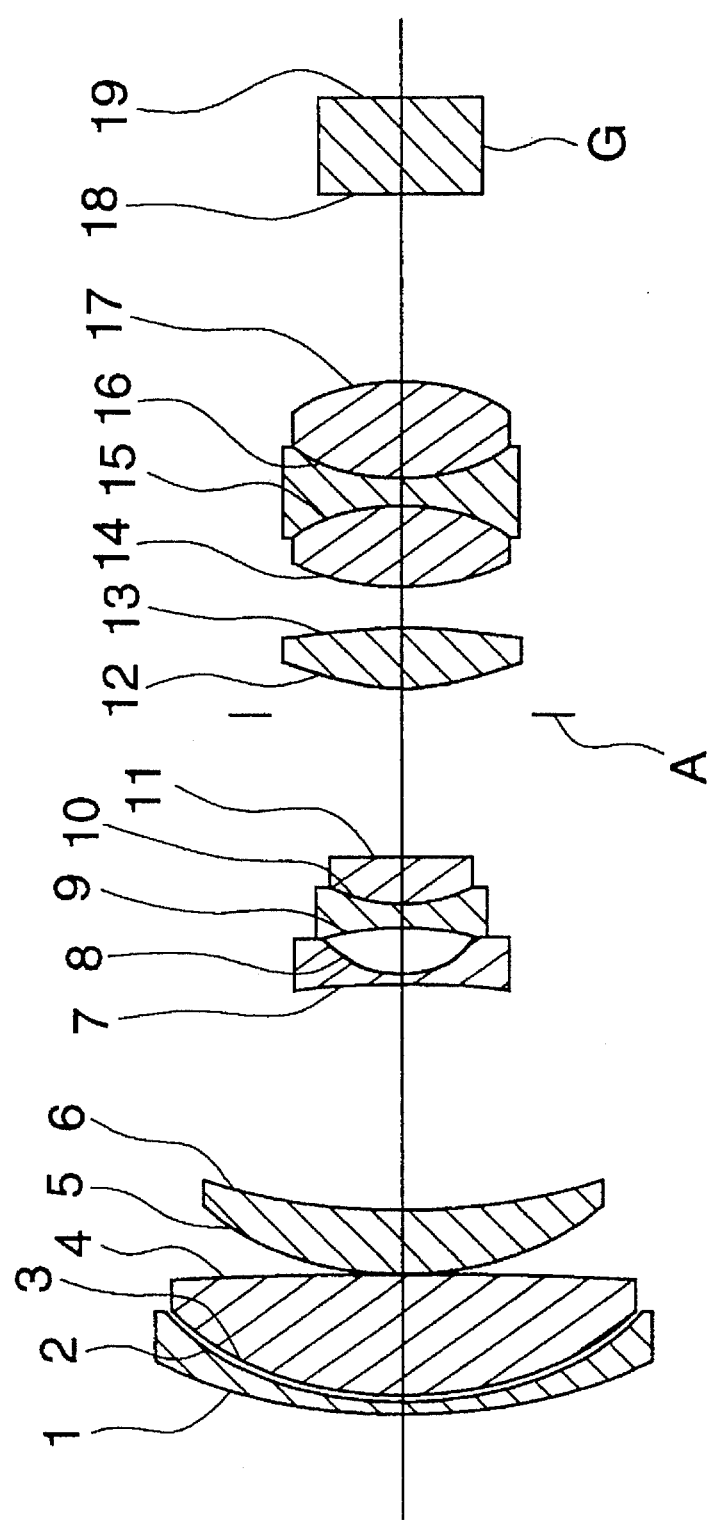
FIG. 9 is a cross sectional view of an optical system of a lens system in the third embodiment.

Further, at the wide angle end in Example 2, aberrations of the zoom lens of the present invention can be satisfactorily compensated for as shown by spherical aberration in FIG. 6(A), astigmatism in FIG. 6(B), and distortion aberration in FIG. 6(C). In the same way, at the intermediate range in Example 2, aberrations of the zoom lens can be satisfactorily compensated for as shown by FIG. 7(A), FIG. 7(B), and FIG. 7(C). At the telescopic end in Example 2, aberrations of the zoom lens can be satisfactorily compensated for as shown by FIG. 8(A), FIG. 8(B), and FIG. 8(C).

Figure 10:
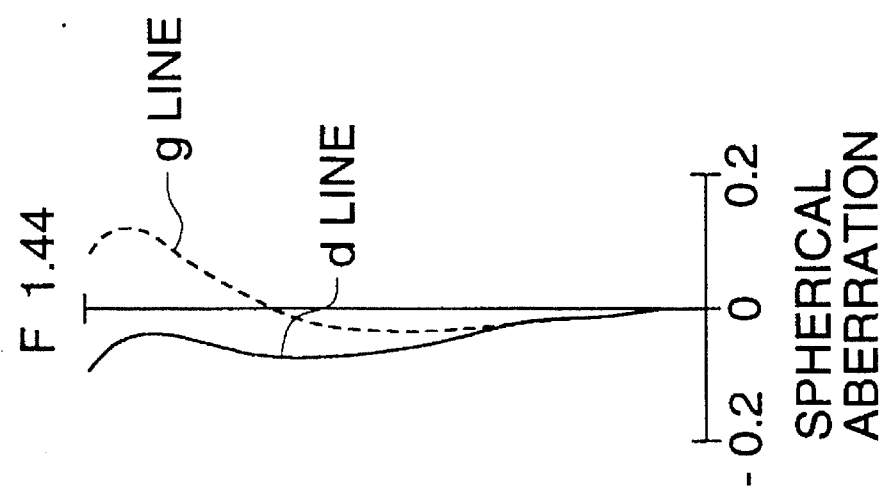
FIGS. 10(A), 10(B) and 10(C) are views showing each characteristic of the zoom lens at the wide angle end in the second embodiment. In this case.
Figure 10:
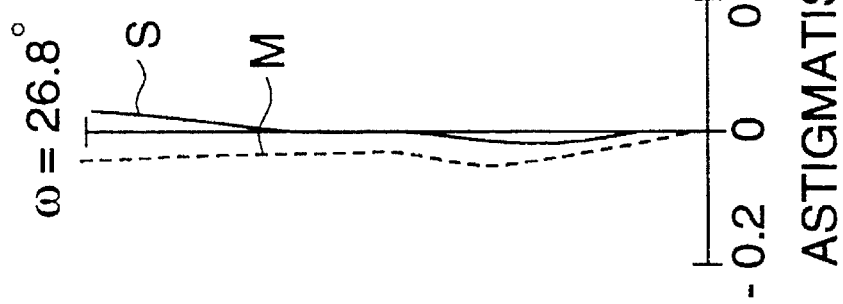
Figure 10:
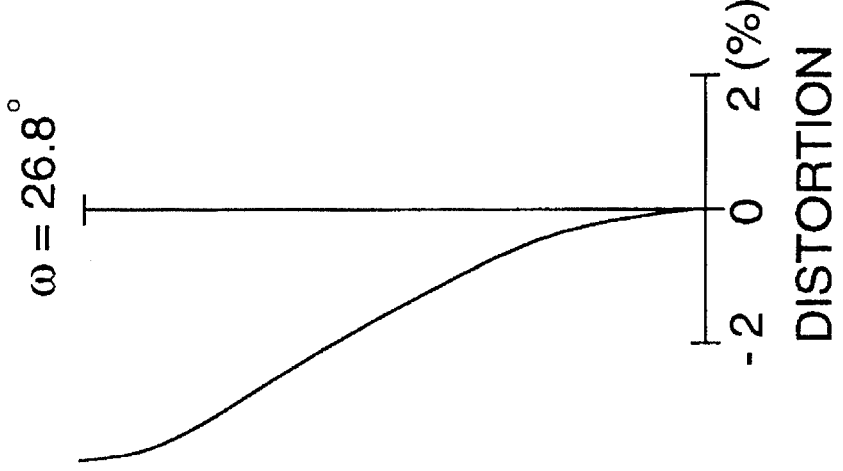
Figure 11:
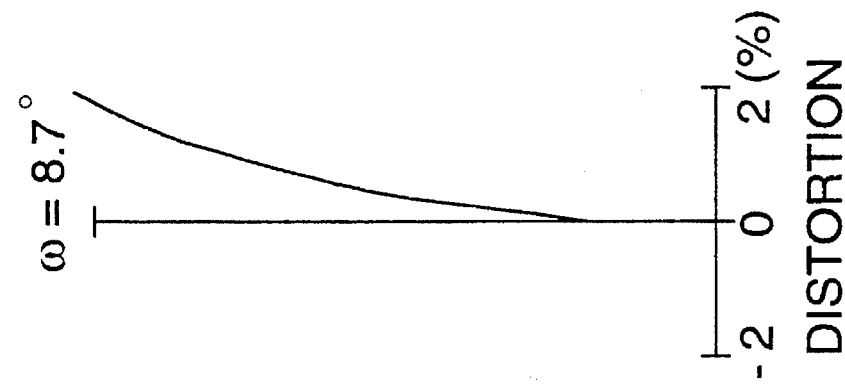
FIGS. 11(A), 11(B) and 11(C) are views showing each characteristic of the zoom lens at an intermediate range in the third embodiment. In this case.
Figure 11:
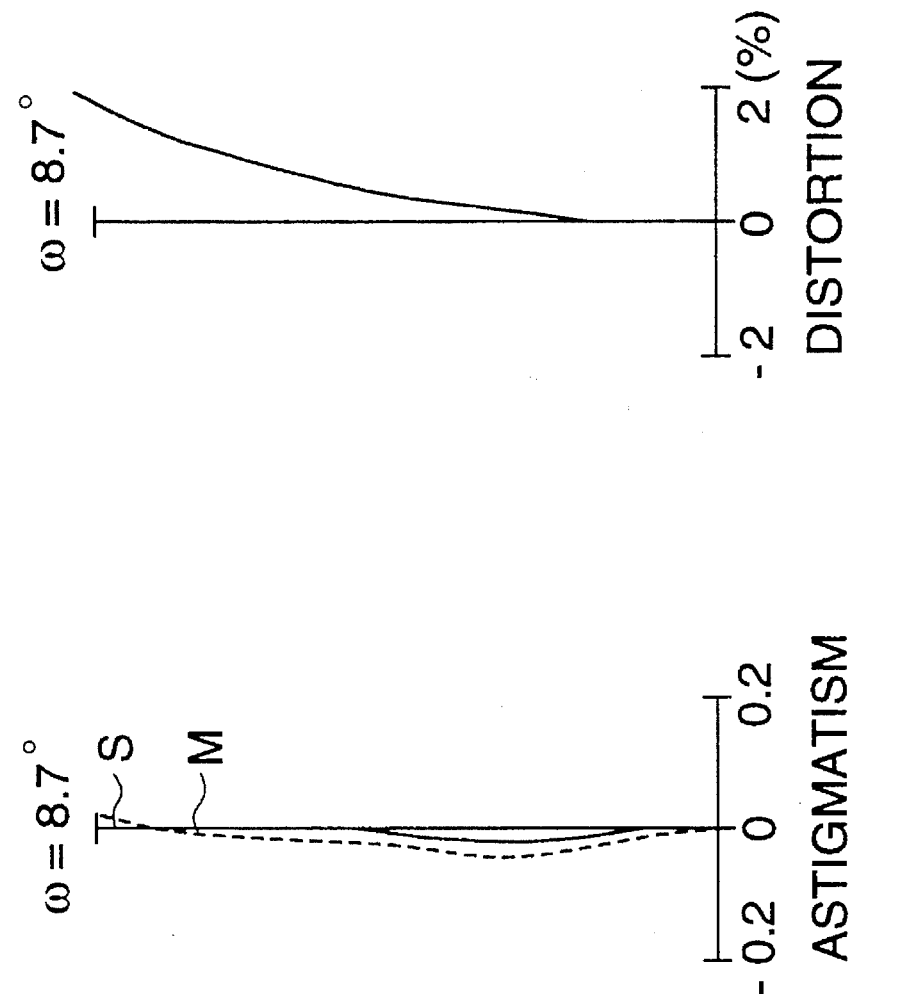
Figure 11:
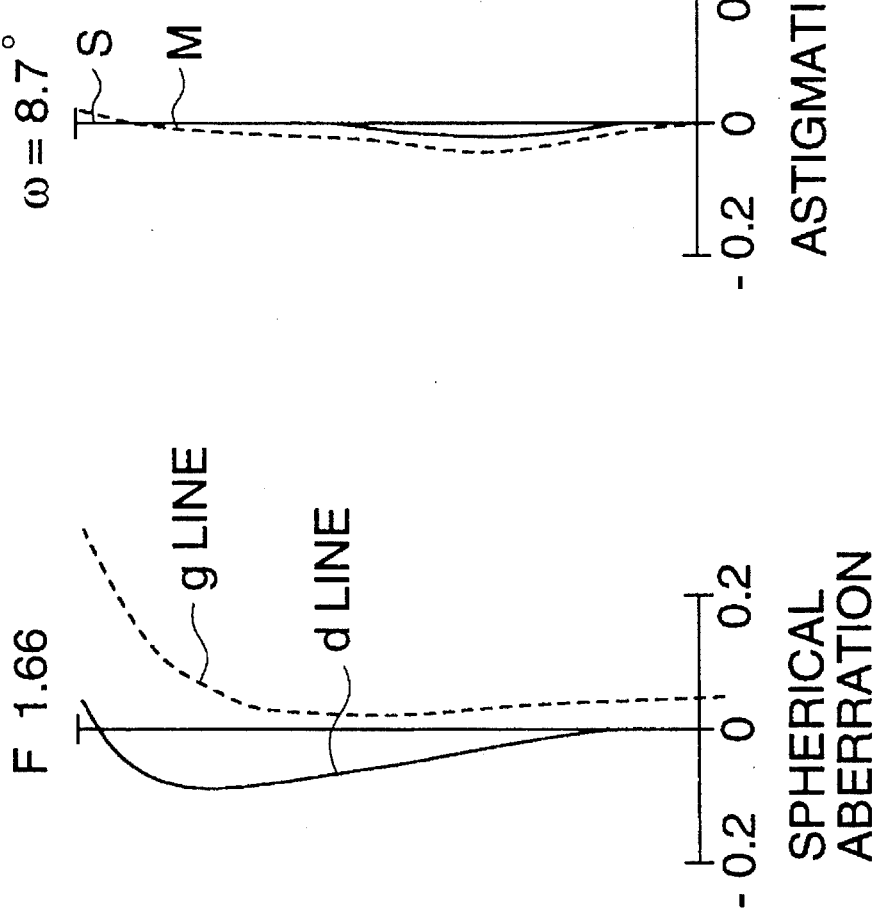
Figure 12:
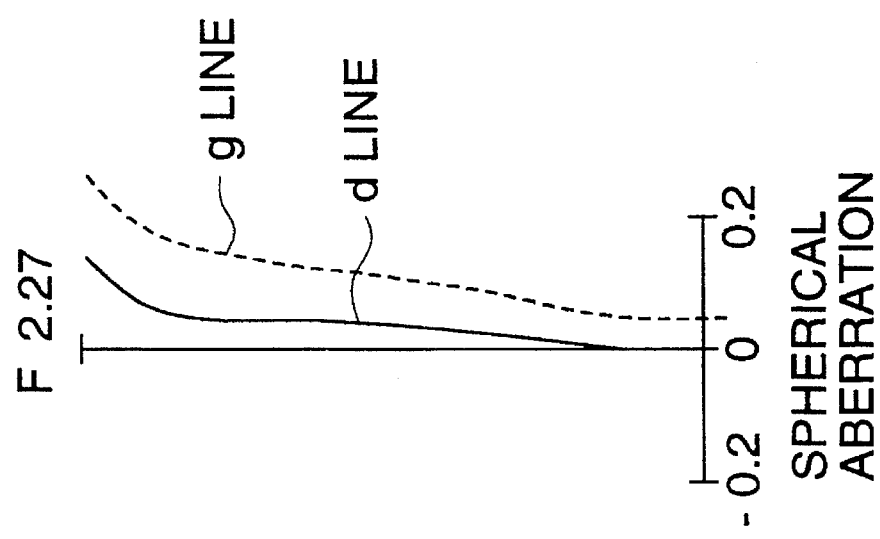
FIGS. 12(A), 12(B) and 12(C) are views showing each characteristic of the zoom lens at the telescopic angle end in the third embodiment. In this case.
Figure 12:
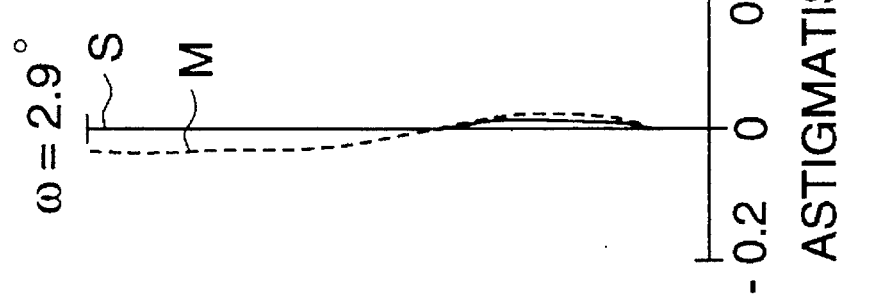
Figure 12:
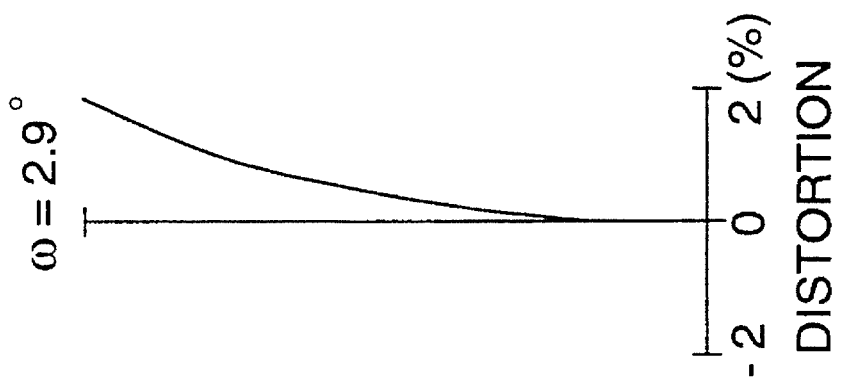
Figure 13:
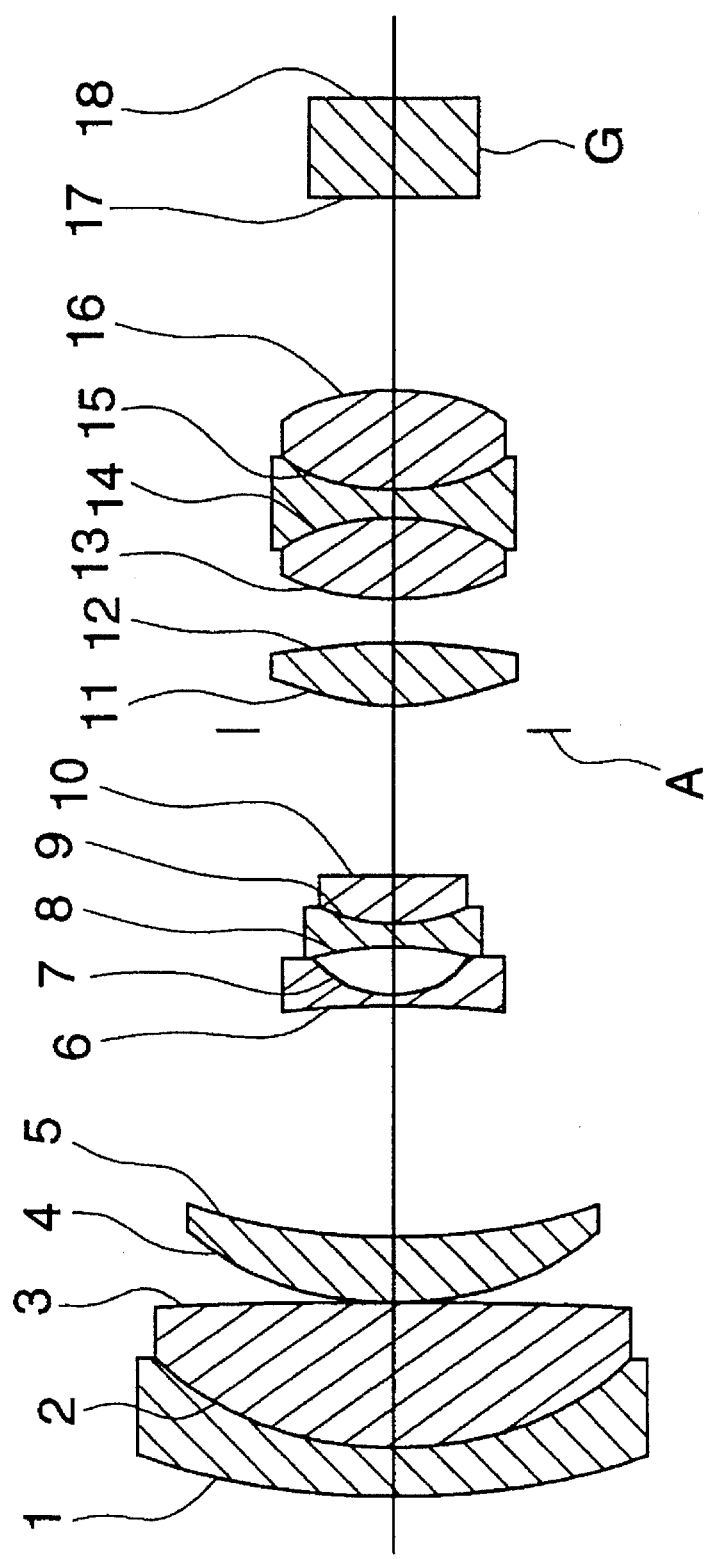
FIG. 13 is a cross sectional view of an optical system of a lens system in the fourth embodiment.

Further, at the wide angle end in Example 3, aberrations of the zoom lens of the present invention can be satisfactorily compensated for as shown by spherical aberration in FIG. 10(A), astigmatism in FIG. 10(B), and distortion aberration in FIG. 10(C). In the same way, at the intermediate range in Example 3, aberrations of the zoom lens can be satisfactorily compensated for as shown by FIG. 11(A), FIG. 11(B), and FIG. 11(C). At the telescopic end in Example 3, aberrations of the zoom lens can be satisfactorily compensated for as shown by FIG. 12(A), FIG. 12(B), and FIG. 12(C).

Figure 14:
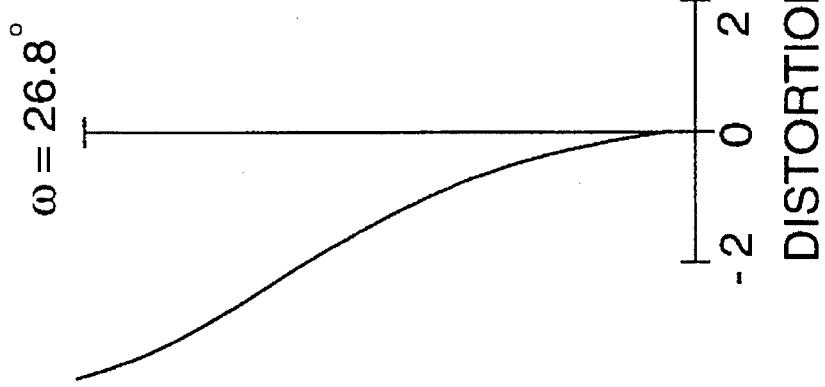
FIGS. 14(A), 14(B) and 14(C) are views showing each characteristic of the zoom lens at the wide angle end in the fourth embodiment. In this case.
Figure 14:
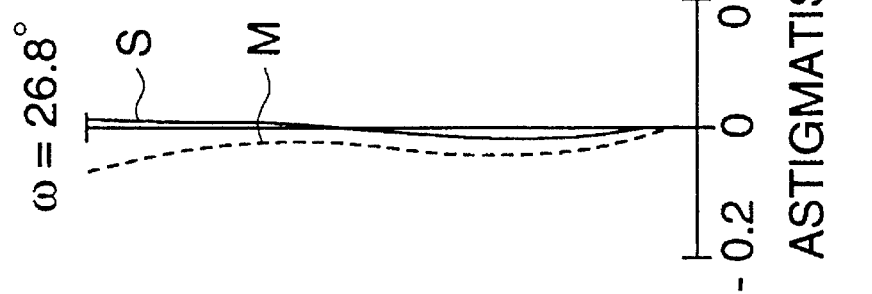
Figure 14:
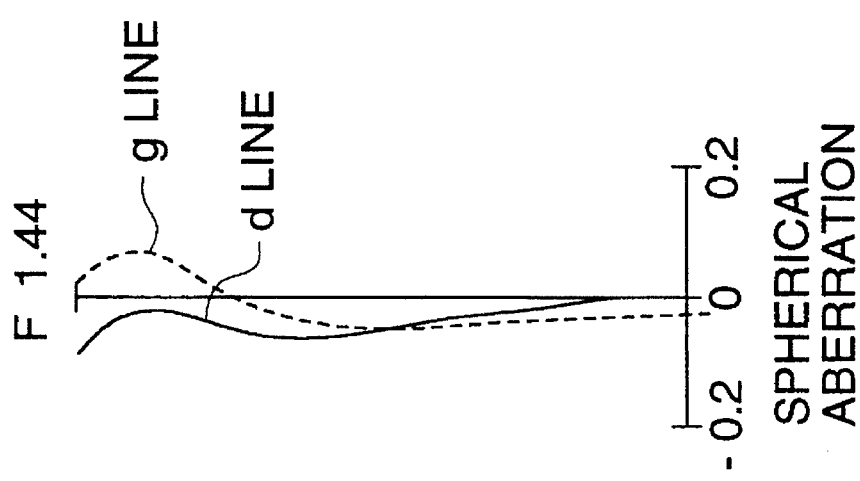
Figure 15:
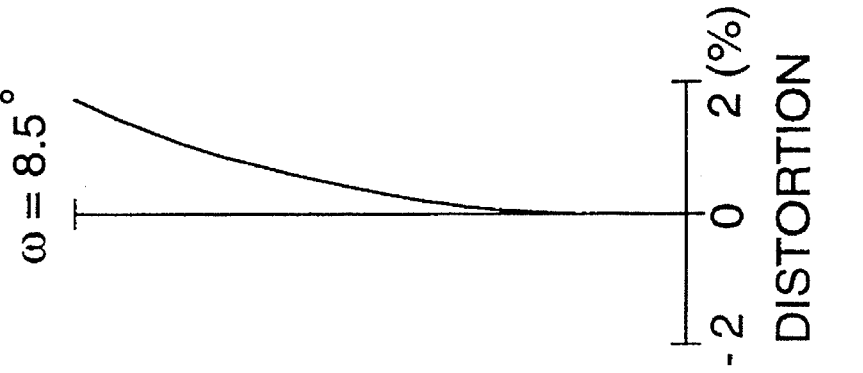
FIGS. 15(A), 15(B) and 15(C) are views showing each characteristic of the zoom lens at an intermediate range in the second embodiment. In this case.
Figure 15:
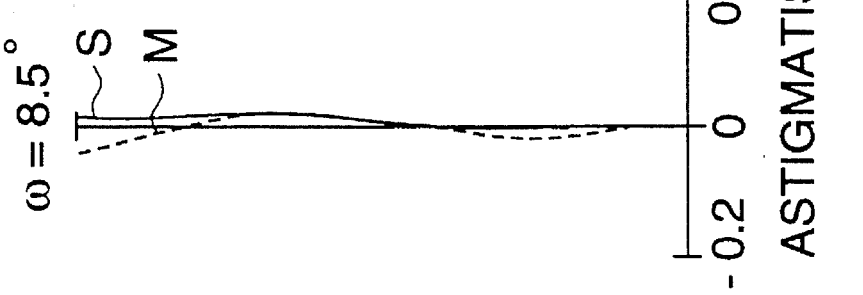
Figure 15:
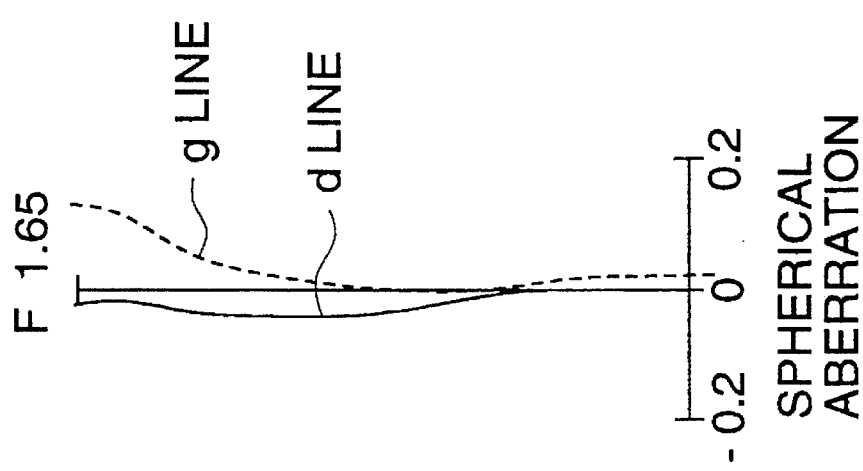
Figure 16:
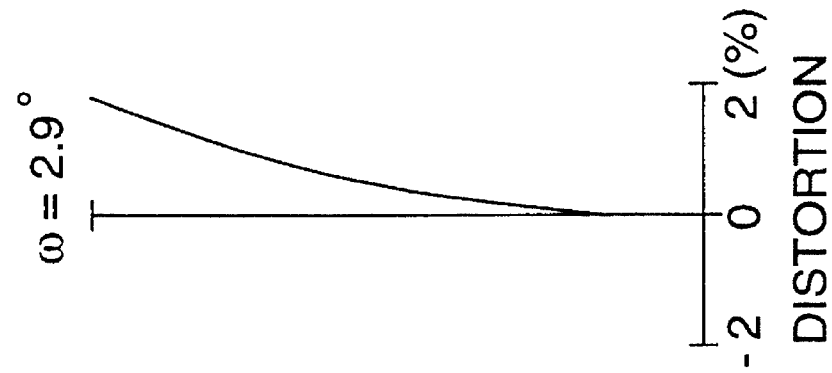
FIGS. 16(A), 16(B) and 16(C) are views showing each characteristic of the zoom lens at the telescopic angle end in the fourth embodiment. In this case.
Figure 16:
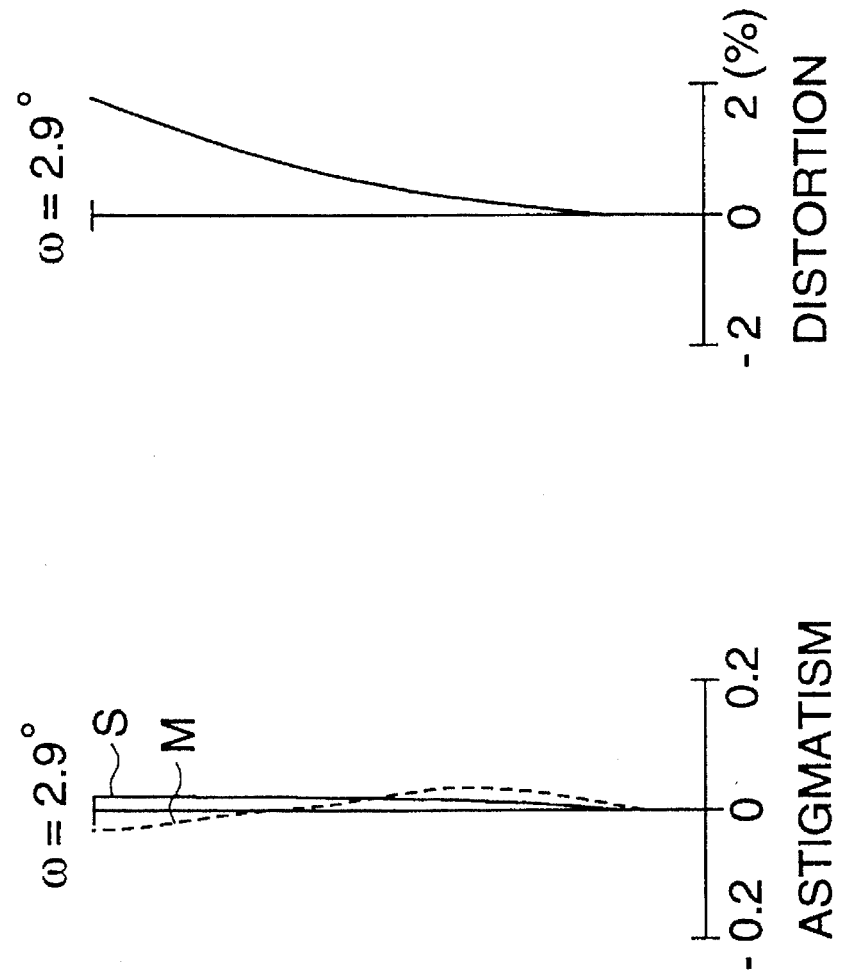
Figure 16:
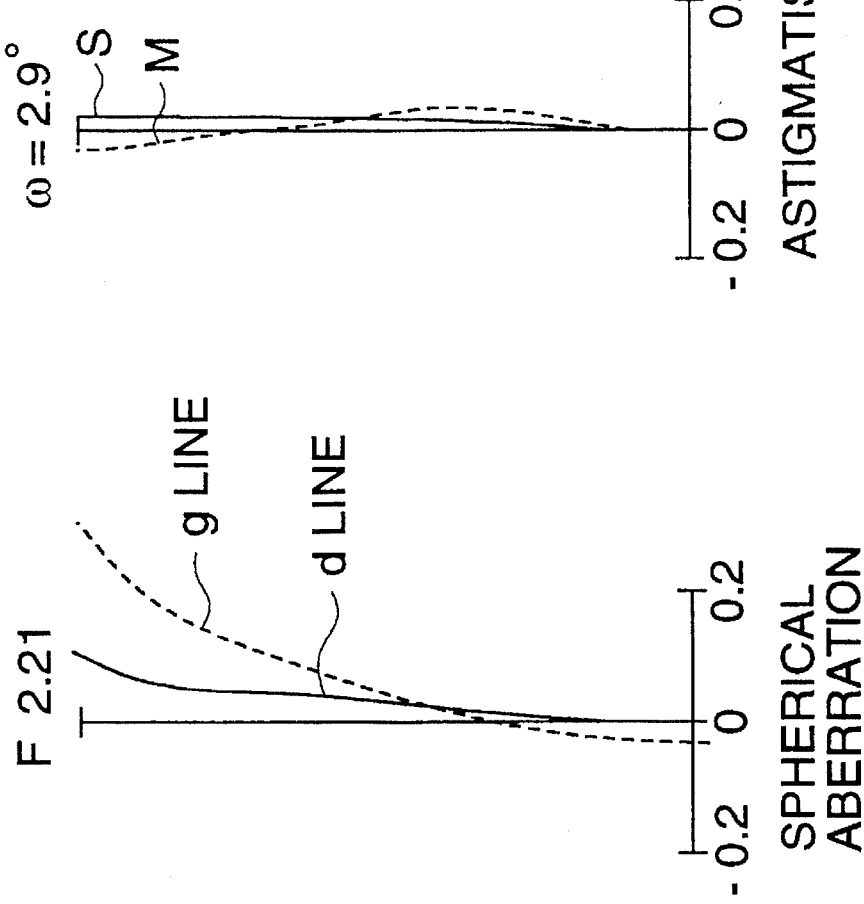
Figure 17:
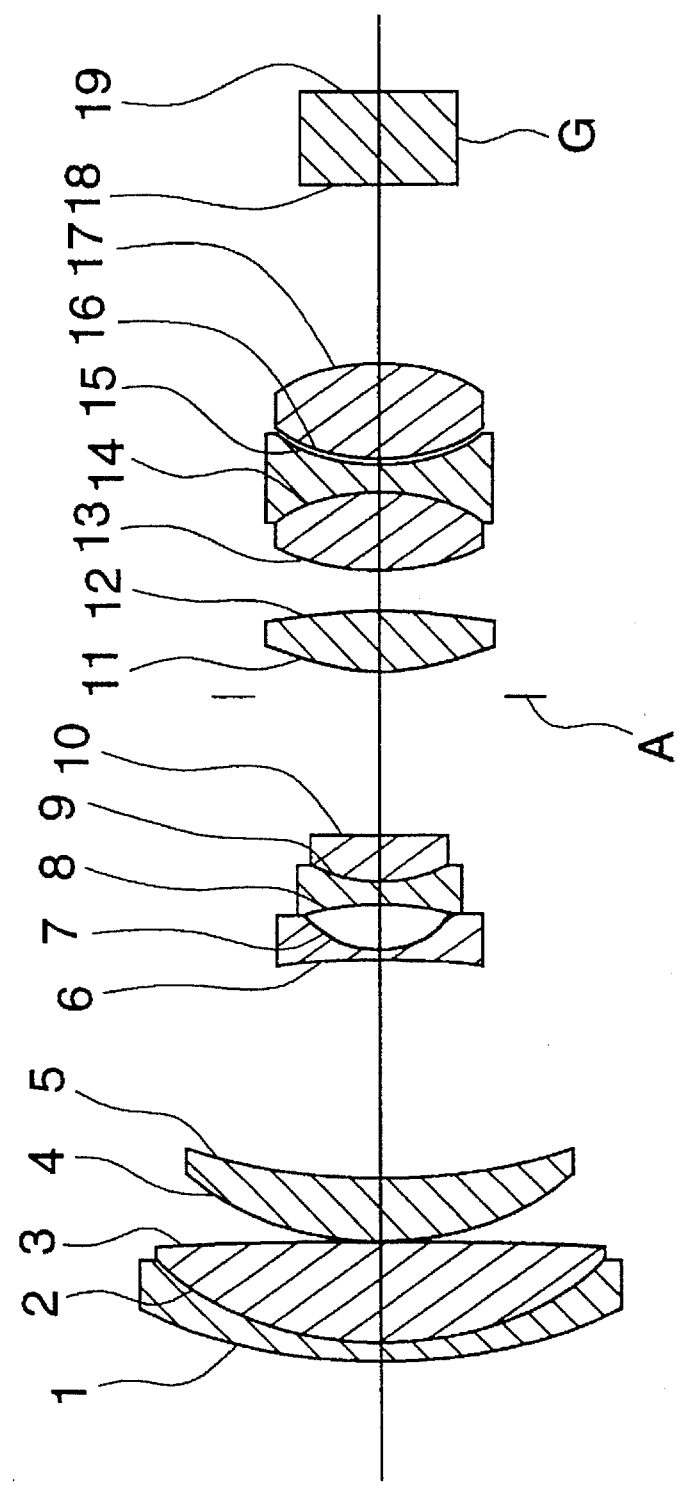
FIG. 17 is a cross sectional view of an optical system of a lens system in the fifth embodiment.

Further, at the wide angle end in Example 4, aberrations of the zoom lens of the present invention can be satisfactorily compensated for as shown by spherical aberration in FIG. 14(A), astigmatism in FIG. 14(B), and distortion aberration in FIG. 14(C). In the same way, at the intermediate range in Example 4, aberrations of the zoom lens can be satisfactorily compensated for as shown by FIG. 15(A), FIG. 15(B), and FIG. 15(C). At the telescopic end in Example 4, aberrations of the zoom lens can be satisfactorily compensated for as shown by FIG. 16(A), FIG. 16(B), and FIG. 16(C).

Figure 18:
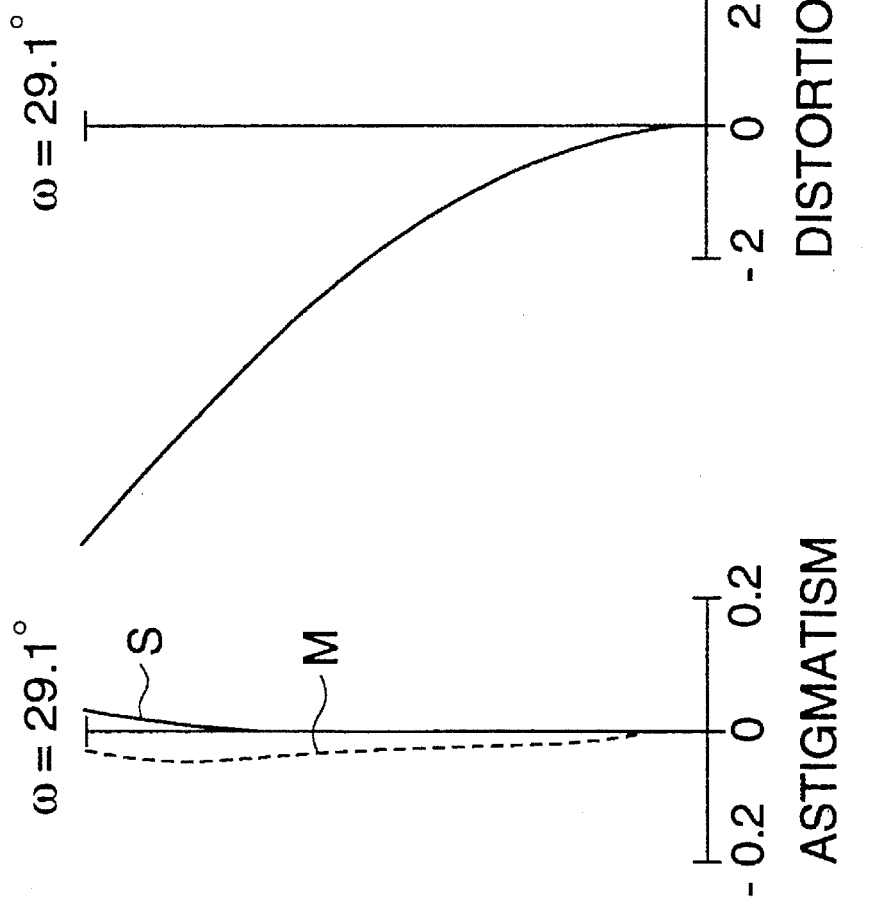
FIGS. 18(A), 18(B) and 18(C) are views showing each characteristic of the zoom lens at the wide angle end in the second embodiment. In this case.
Figure 19:
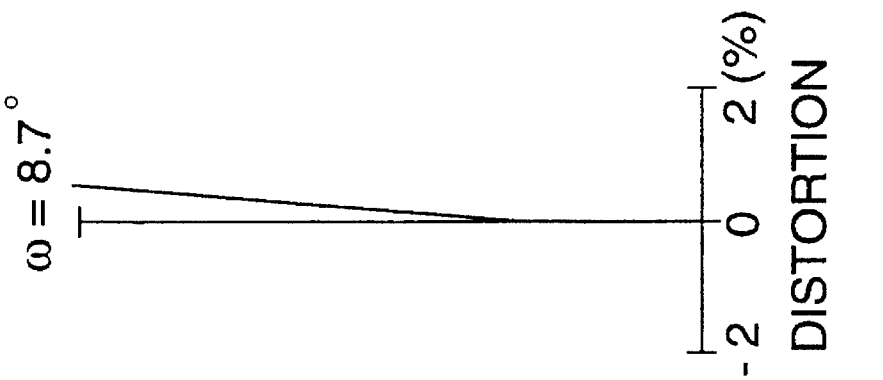
FIGS. 19(A), 19(B) and 19(C) are views showing each characteristic of the zoom lens at an intermediate range in the second embodiment. In this case.
Figure 19:
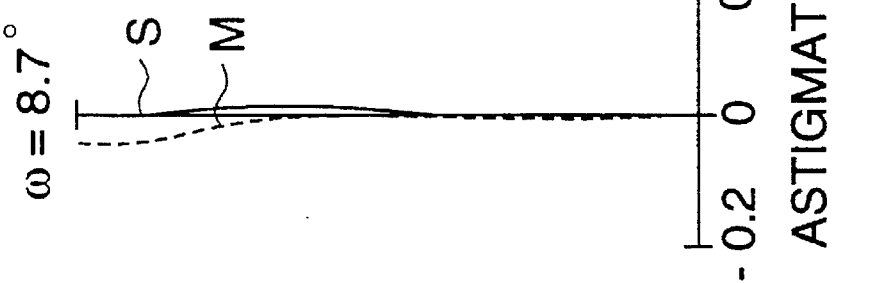
Figure 19:
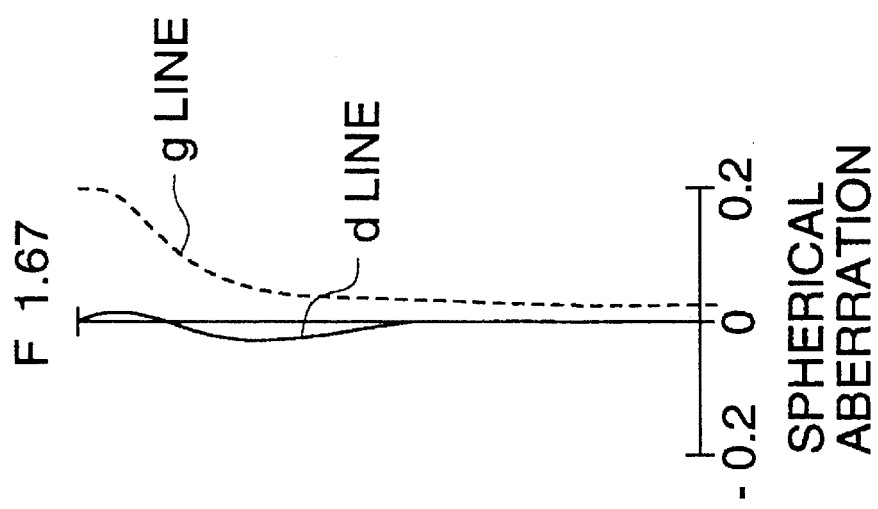

Further, at the wide angle end in Example 5, aberrations of the zoom lens of the present invention can be satisfactorily compensated for as shown by spherical aberration in FIG. 18(A), astigmatism in FIG. 18(B), and distortion aberration in FIG. 18(C). In the same way, at the intermediate range in Example 5, aberrations of the zoom lens can be satisfactorily compensated for as shown by FIG. 19(A), FIG. 19(B), and FIG. 19(C). At the telescopic end in Example 5, aberrations of the zoom lens can be satisfactorily compensated for as shown by FIG. 20(A), FIG. 20(B), and FIG. 20(C).

The present invention is not limited to the above-described examples, however, it can be variously modified in the range of the present invention without departing from the spirit of the invention.

Due to the foregoing, a zoom lens, which is appropriate for small-sized video cameras, etc., and has a high magnification ratio of about 10 through 12 and a F-number of about F1.4, can be provided according to the present invention, wherein the zoom lens is compact and also composed of a larger number of plastic lenses, and the cost of the zoom a plastic material and a positive lens which is made from a plastic material, and wherein said biconcave lens and said positive lens are cemented together.

4. The zoom lens of claim 3, wherein at least one surface of said biconcave lens and said positive lens is aspherical.

5. The zoom lens of claim 1, wherein the following conditions are satisfied:

$0.8 < |f_2|/f_w < 1.6$ $n_{21} > 1.60$ $v_{4P} - v_{4N} > 15$ where $f_2$ represents a focal length of said second lens group, $f_w$ represents a focal length at a wide angle end of an entire lens system of said zoom lens, $n_{21}$ represents a refractive index of a lens provided closest to the object side in said second lens group, $v_{4P}$ represents an average value of the Abbe's number of said positive lenses in said fourth lens group, and $v_{4N}$ represents an average value of the Abbe's number of said negative lens in said fourth lens group.

6. The zoom lens of claim 3, wherein the following conditions are satisfied:

$0.8 < |f_2|/f_w < 1.6$ $n_{21} \geq 1.60$ $v_{4P} - v_{4N} > 15$ where $f_2$ represents a focal length of said second lens group, $f_w$ represents a focal length at a wide angle end of an entire lens system of said zoom lens, $n_{21}$ represents a refractive index of a lens provided closest to the object side in said second lens group, $v_{4P}$ represents an average value of the Abbe's number of said positive lenses in said fourth lens group, and $v_{4N}$ represents an average value of the Abbe's number of said negative lens in said fourth lens group.

* * * * *

UNITED STATES PATENT AND TRADEMARK OFFICE
CERTIFICATE OF CORRECTION

PATENT NO. : 5,546,231
DATED : August 13, 1996
INVENTOR(S) : Hiroshi SATO

Page 1 of 4

It is certified that error appears in the above-indentified patent and that said Letters Patent is hereby corrected as shown below:

Column 9, Line 48, "$A_3=1.0825 \times 10^{-1}$" should read --$A_3=1.0825 \times 10^{-11}$--;

Column 10, Line 45, "$18\infty$" should read --$19\infty$--.

Column 12, line 19, starting at the end of the line, insert the following missing text:

--lens is further greatly reduced as compared with conventional lenses.

What is claimed is:

1. A zoom lens comprising, in the order named from an object side;
   (a) a first lens group having a positive refractive power;
   (b) a second lens group having a negative refractive power, being movable along an optical axis of said zoom lens in accordance with a change of magnification;

UNITED STATES PATENT AND TRADEMARK OFFICE
CERTIFICATE OF CORRECTION

PATENT NO. : 5,546,231
DATED : August 13, 1996
INVENTOR(S) : Hiroshi SATO

It is certified that error appears in the above-indentified patent and that said Letters Patent is hereby corrected as shown below:

(c) a third lens group having a positive refractive power provided at a fixed position; and (d) a fourth lens group having a positive refractive power, being movable along the optical axis, for compensating for a positional change of an image plane according to said change of magnification, wherein said fourth lens group includes at least two positive lenses and at least on negative lens, and wherein at least two lenses constituting said fourth lens group are made of plastic lenses which are cemented together.

2. The zoom lens of claim 1, wherein said fourth lens group comprises, in succession from the object side, a biconvex lens, a biconcave lens and a biconvex lens in which at least one surface in said fourth lens group is an aspherical surface.

UNITED STATES PATENT AND TRADEMARK OFFICE
CERTIFICATE OF CORRECTION

PATENT NO. : 5,546,231
DATED : August 13, 1996
INVENTOR(S) : Hiroshi SATO

It is certified that error appears in the above-indentified patent and that said Letters Patent is hereby corrected as shown below:

3. A zoom lens comprising, in the order named from an object side;

(a) a first lens group having a positive refractive power, (b) a second lens group having a negative refractive power, being movable along an optical axis of said zoom lens in accordance with a change of magnification;

(c) a third lens group having a positive refractive power provided at a fixed position; and (d) a fourth lens group having a positive refractive power, being movable along the optical axis, for compensating for a positional change of an image plane according to said change magnification,

UNITED STATES PATENT AND TRADEMARK OFFICE
CERTIFICATE OF CORRECTION

PATENT NO. : 5,546,231
DATED : August 13, 1996
INVENTOR(S) : Hiroshi SATO

It is certified that error appears in the above-indentified patent and that said Letters Patent is hereby corrected as shown below:

wherein said second lens group comprises, in succession from the object side, a negative lens having first and second surfaces, the first surface of which has a smaller radius of curvature than the second surface and faces the image plane, a biconcave lens which is made from --

Signed and Sealed this

Twentieth Day of May, 1997

*Attest:*

BRUCE LEHMAN

*Attesting Officer*   Commissioner of Patents and Trademarks